United States Patent
Garakani et al.

(10) Patent No.: US 7,672,369 B2
(45) Date of Patent: Mar. 2, 2010

(54) METHOD AND APPARATUS FOR ACQUISITION, COMPRESSION, AND CHARACTERIZATION OF SPATIOTEMPORAL SIGNALS

(75) Inventors: Arman M. Garakani, Cambridge, MA (US); Andrew A. Hack, Pride's Crossing, MA (US); Peter Roberts, Dedham, MA (US); Sean Walter, Needham, MA (US)

(73) Assignee: Reify Corporation, Cambridge, MA (US)

( * ) Notice: Subject to any disclaimer, the term of this patent is extended or adjusted under 35 U.S.C. 154(b) by 1154 days.

(21) Appl. No.: 10/366,756

(22) Filed: Feb. 13, 2003

(65) Prior Publication Data

US 2003/0185450 A1    Oct. 2, 2003

Related U.S. Application Data

(60) Provisional application No. 60/356,317, filed on Feb. 13, 2002.

(51) Int. Cl.
| | |
|---|---|
| H04N 7/12 | (2006.01) |
| H04N 11/02 | (2006.01) |
| H04N 11/04 | (2006.01) |
| H04B 1/66 | (2006.01) |

(52) U.S. Cl. .................................. 375/240.01
(58) Field of Classification Search ............... 375/240.1
See application file for complete search history.

(56) References Cited

U.S. PATENT DOCUMENTS

| | | | |
|---|---|---|---|
| 4,724,543 A | 2/1988 | Klevecz et al. | |
| 5,091,780 A * | 2/1992 | Pomerleau | ................ 348/152 |
| RE34,965 E | 6/1995 | Sugiyama | |
| 5,491,084 A | 2/1996 | Chalfie et al. | |
| 5,548,661 A | 8/1996 | Price et al. | |

(Continued)

FOREIGN PATENT DOCUMENTS

| | | |
|---|---|---|
| AU | 2003211104 | 9/2003 |

(Continued)

OTHER PUBLICATIONS

Corpetti et al. "Dense Estimation of Fluid Flows" *IEEE Transactions on Pattern Analysis and Machine Intelligence* 24(3):368-380 (1998).

(Continued)

*Primary Examiner*—Nhon T Diep
(74) *Attorney, Agent, or Firm*—Fish & Richardson P.C.

(57) ABSTRACT

The present invention provides methods and apparatus for acquisition, compression, and characterization of spatiotemporal signals. In one aspect, the invention assesses self-similarity over the entire length of a spatiotemporal signal, as well as on a moving attention window, to provide cost effective measurement and quantification of dynamic processes. The invention also provides methods and apparatus for measuring self-similarity in spatiotemporal signals to characterize, adaptively control acquisition and/or storage, and assign meta-data for further detail processing. In some embodiments, the invention provides for an apparatus adapted for the characterization of biological units, and methods by which attributes of the biological units can be monitored in response to the addition or removal of manipulations, e.g., treatments. The attributes of biological units can be used to characterize the effects of the abovementioned manipulations or treatments as well as to identify genes or proteins responsible for, or contributing to, these effects.

13 Claims, 10 Drawing Sheets

U.S. PATENT DOCUMENTS

| | | | |
|---|---|---|---|
| 5,670,113 | A | 9/1997 | Akong et al. |
| 5,732,150 | A | 3/1998 | Zhou et al. |
| 5,859,700 | A | 1/1999 | Yang |
| 5,989,835 | A | 11/1999 | Dunlay et al. |
| 6,009,418 | A | 12/1999 | Cooper |
| 6,035,057 | A | 3/2000 | Hoffman |
| 6,103,479 | A | 8/2000 | Taylor |
| 6,192,080 | B1 | 2/2001 | Sun et al. |
| 6,201,880 | B1 * | 3/2001 | Elbaum et al. ............... 382/100 |
| 6,272,253 | B1 | 8/2001 | Bannon et al. |
| 6,310,967 | B1 * | 10/2001 | Heine et al. .................. 382/128 |
| 6,360,017 | B1 | 3/2002 | Chiu et al. |
| 6,416,959 | B1 | 7/2002 | Giuliano et al. |
| 6,509,167 | B1 | 1/2003 | Hartman et al. |
| 6,542,626 | B1 * | 4/2003 | Brouwer et al. ............. 382/128 |
| 6,573,039 | B1 | 6/2003 | Dunlay et al. |
| 6,620,591 | B1 | 9/2003 | Dunlay et al. |
| 6,654,504 | B2 | 11/2003 | Lubin et al. |
| 6,671,624 | B1 | 12/2003 | Dunlay et al. |
| 6,727,071 | B1 | 4/2004 | Dunlay et al. |
| 6,756,207 | B1 | 6/2004 | Giuliano et al. |
| 6,759,206 | B1 | 7/2004 | Rubin et al. |
| 2001/0041347 | A1 | 11/2001 | Sammak et al. |
| 2002/0010691 | A1 | 1/2002 | Chen |
| 2002/0016782 | A1 | 2/2002 | Cooper |
| 2002/0154798 | A1 | 10/2002 | Cong et al. |
| 2003/0096322 | A1 | 5/2003 | Giuliano et al. |

FOREIGN PATENT DOCUMENTS

| | | |
|---|---|---|
| CA | 2476072 | 9/2003 |
| EP | 0 983 498 B1 | 5/2004 |
| EP | 1486067 | 12/2004 |
| JP | 5164800 | 6/1993 |
| JP | 5164800 (A) | 6/1993 |
| JP | 06-160507 | 6/1994 |
| JP | 07-248718 | 9/1995 |
| JP | 7248718 | 9/1995 |
| JP | 7248718 (A) | 9/1995 |
| JP | 11-316820 | 11/1999 |
| JP | 11316820 (A) | 11/1999 |
| JP | 11328184 | 11/1999 |
| JP | 11328184 (A) | 11/1999 |
| JP | 2000-163600 | 6/2000 |
| JP | 2001500744 | 1/2001 |
| JP | 2005-521126 | 7/2005 |
| WO | WO 98/38490 | 9/1998 |
| WO | 01/94528 | 12/2001 |
| WO | WO 01/94528 A2 | 12/2001 |
| WO | 03/077552 | 9/2003 |

OTHER PUBLICATIONS

Maheshwari et al. "Deconstructing (and Reconstructing) Cell Migration" *Microscopy Research and Technique* 43:358-368 (1998).

Ancona and Poggio, "Optical Flow from 1D Correlation: Application to a simple Time-To-Crash Detector," A.I. Memo No. 1375, C.B.C.L. Paper No. 74, Artificial Intelligence Laboratory, Massachusetts Institute of Technology, Cambridge, MA (1993).

Balkenius and Hulth, "Attention as Selection-for-Action: A Scheme for Active Perception," In Schweitzer, G., Burgard, W., Nehmzow, U., and Vestli, S. J. (Eds.), *Proceedings of EUROBOT '99*, pp. 113-119 (1999).

Barron et al., "Performance of Optical Flow Techniques," *International Journal of Computer Vision*, 12:43-77 (1994).

Beck-Sickinger, "Structural characterization and binding sites of G-protein-coupled receptors," *Drug Discovery Today*, 1(12):502-513 (1996).

Bell and Sejnowski, "An information-maximisation approach to blind separation and blind deconvolution," *Neural Computation*, 7(6):1129-1159 (1995).

BenAbdelkader et al., "EigenGait: Motion-based Recognition of People using Image Self-Similarity," *Lecture Notes in Computer Science*, 2091:284 (2001).

Beysens et al., "Cell sorting is analogous to phase ordering in fluids," *Proc. Natl. Acad. Sci. USA*, 97(17):9467-9471 (2000).

Boland and Murphy, "Automated analysis of patterns in fluorescence-microscope images," *Trends Cell Biol.*, vol. 9:201-202 (1999).

Brown, "A Survey of Image Registration Techniques," *ACM Computing Surveys*, 24(4)325-376 (1992).

Chon et al., "Characterization of Single-Cell Migration Using a Computer-Aided Fluorescence Time-Lapse Videomicroscopy System," *Anal. Biochem.*, 252:246-254 (1997).

Corpetti et al., "Dense Estimation of Fluid Flows," *IEEE Transactions on Pattern Analysis and Machine Intelligence*, 24(3):365-380 (2002).

Delbridge and Roos, "Optical Methods to Evaluate the Contractile Function of Unloaded Isolated Cardiac Myocytes," *J. Mol. Cell. Cardiol.*, 29:11-25 (1997).

Eils and Athale, "Computational imaging in cell biology," *J. Cell Biol.*, 161(3):477-481 (2003).

Friman et al., "A Correlation Framework for Functional MRI Data Analysis," *Proceedings of the $12^{th}$ Scandinavian Conference on Image Analysis*, Norway (2001).

Friman et al., "Detection of Neural Activity in Functional MRI Using Canonical Correlation Analysis," *Magnetic Resonance in Medicine*, 45:323-330 (2001).

Gannier et al., "Measurements of Sarcomere Dynamics Simultaneously with Auxotonic Force in Isolated Cardiac Cells," *IEEE Transactions on Biomedical Engineering*, 40(12):1226-1232 (1993).

Gerlich et al., "Four-dimensional imaging and quantitative reconstruction to analyse complex spatiotemporal processes in live cells," *Nature Cell Biology*, 3:852-855 (2001).

Gerlich et al., "Quantitative motion analysis and visualization of cellular structures," *Methods*, 29:3-13 (2003).

Halevy and Weinshall, "Motion of disturbances: detection and tracking of multi-body non rigid motion," *Machine Vision Applications*, 11(3):122-137 (1998).

Horn, "Motion Fields Are Hardly Ever Ambiguous," *International Journal of Computer Vision*, 1:259-274 (1987).

Horn and Weldon, "Direct Methods for Recovering Motions," *International Journal of Computer Vision*, 2:51-76 (1988).

Jähne et al., "Image Sequence Analysis to Investigate Dynamic Processes," University of Heidelberg, Germany, *Progress Report Phase I*(1998).

Kortmann et al., "Evolution of Visual Resolution Constrained by a Trade-off," *Artificial Life*, 7:125-145 (2001).

Kovalev and Shirkov, "Functional self-similarity and renormalization group symmetry in mathematical physics," *Theor. Math. Phys.*, 121:1315-1332 (1999).

Maheshwari and Lauffenburger, "Deconstructing (and Reconstructing) Cell Migration," *Microscopy Research and Technique*, 43:358-368 (1998).

Markey et al., "Toward Objective Selection of Representative Microscope Images," *Biophys. J.*, 76:2230-2237 (1999).

Matko et al., "Luminescence Quenching by Long Range Electron Transfer: A Probe of Protein Clustering and Conformation at the Cell Surface," *Cytometry*, 19:191-200 (1995).

Paillard and Amblard, "Static versus kinetic visual cues for the processing of spatial relationships," In: Ingle, D.J., Jeannerod, M., Lee, D.N. (eds.), *Brain Mechanisms in Spatial Vision*, Martinus Nijhof, La Haye, pp. 299-330 (1985).

Phair and Misteli, "Kinetic Modelling Approaches to In Vivo Imaging," *Nat. Rev. Mol. Cell Biol.*, 2:898-907 (2001).

Proffitt et al., "A Fluorescence Digital Image Microscopy System for Quantifying Relative Cell Numbers in Tissue Culture Plates," *Cytometry*, 24:204-213 (1996).

Rizzuto et al., "Chimeric green fluorescent protein as a tool for visualizing subcellular organelles in living cells," *Current Biology*, 5(6):635-642 (1995).

Roos and Brady, "Individual sarcomere length determination from isolated cardiac cells using high-resolution optical microscopy and digital image processing," *Biophys. J.*, 40:233-244 (1982).

Roos et al., "Direct measurement of sarcomere length from isolated cardiac cells," *Am. J. Physiol.*, 242:H68-78 (1982).

Rosin and West, "Nonparametric Segmentation of Curves into Various Representations," *IEEE Transactions on Pattern Analysis and Machine Intelligence*, 17(12):1140-1153 (1995).

Schroeder and Neagle, "FLIPR: A New Instrument for Accurate, High Throughput Optical Screening," *Journal of Biomolecular Screening*, 1(2):75-80 (1996).

Shelden and Feldman, "Automated difference image analysis of lamellar ruffling: effect of temperature change on human SH-SY5Y neuroblastoma cells," *J. Neurosci. Methods*, 102:143-154 (2000).

Shotton et al., "Object Tracking and Event Recognition in Biological Microscopy Videos," *ICPR 2000*, 4:4226-4229 (2000).

Steadman et al., "A Video System for Measuring Motion in Contracting Heart Cells," *IEEE Trans. Biomed. Eng.*, 35(4):264-272 (1988).

Taylor et al., "Automated Interactive Microscopy: Measuring and Manipulating the Chemical and Molecular Dynamics of Cells and Tissues," *Proc. Soc. Photo-Optical Instr. Eng.*, 2678:15-27 (1996).

Taylor et al., "The New Vision of Light Microscopy," *American Scientist*, 80:322-335 (1992).

Thurston et al., "Cell Motility Measurements with an Automated Microscope System," *Exp. Cell Res.*, 165:380-390 (1986).

Tomasi and Kanade, "Shape and Motion from Image Streams: a Factorization Method," Cornell report TR 92-1270 and Carnegie Mellon report CMU-CS-92-104 (1992).

Tvaruskó et al., "Timer-resolved analysis and visualization of dynamic processes in living cells," *Proc. Natl. Acad. Sci. USA*, 96:7950-7955 (1999).

Wolska and Solaro, "Method for isolation of adult mouse cardiac myocytes for studies of contraction and microfluorimetry," *Am. J. Physiol.*, 271:H1250-1255 (1996).

Zimmer et al., "Improving Active Contours for Segmentation and Tracking of Motile Cells in Videomicroscopy," *ICPR 2002*, 2:286-289 (2002).

Zoccolan and Torre, "Using Optical Flow to Characterize Sensory-Motor Interactions in a Segment of the Medicinal Leech," *J. Neurosci.*, 22(6):2283-2298 (2002).

Zoccolan et al., "The use of optical flow to characterize muscle contraction," *J. Neurosci. Methods*, 110:65-80 (2001).

Theodoridis, Sergios and Koutroumbas, Konstantinos. *Pattern Recognition*. Third Edition. San Diego, Academic Press, 2006.

Cooper et al., Scene Bondary Detection Via Video Self-similarity Analysis, IEEE, pp. 378-381 (2001).

Mukai et al., "A symbol grounding problem of gesture motion through a self-organizing network of time-varing motion images", IEEE, pp. 721-726 (2009).

Toyoura et al., "A Method for Un-supervised Learning of a Network Model from Time Sequences", vol. J82-D11, No. 1, pp.. 61-74, (1999) (English Translation with Certificate of Accuracy).

\* cited by examiner

Figure 10

| Therapeutic Area / Attribute | Cancer | Cardiovascular | Inflammation | Infection & Immunity | Nervous System |
|---|---|---|---|---|---|
| Motility | Invasion and Metastasis | WBC Infiltration of Plaque | Chemotaxis | Pathogen Motility | Neuron or Axon Growth Cone Migration |
| Division | Mitosis Inhibitors | Neointimal Proliferation | WBC Proliferation | Pathogen Division | Cancer Cell Proliferation |
| Shape Change | Cytoskeletal Dynamics | Smooth or Cardiac Muscle Contraction | Chemotaxis | Phagocytosis | Neurite Outgrowth |
| Adherence | Invasion and Metastasis | Platelet Activation | WBC Rolling and Adherence | Pathogen Adherence | Platelet Activation |
| Differentiation | Hematopoiesis | Stem Cells into Cardiomyocytes | WBC Maturation | Hematopoiesis | Stem Cells into Neurons |
| Subcellular | Apoptosis Induction | Muscle Action Potential | Receptor Internalization | Host-Parasite Interactions | Nerve Action Potential |
| Multicellular | Angiogenesis | Zebrafish Heart Rate/Rhythm/ Contraction | WBC Activation | Phagocytosis | Nematode Serotonin Behaviors |

METHOD AND APPARATUS FOR ACQUISITION, COMPRESSION, AND CHARACTERIZATION OF SPATIOTEMPORAL SIGNALS

CLAIM OF PRIORITY

This application claims priority under 35 USC §119(e) to U.S. Patent Application Ser. No. 60/356,317, filed on Feb. 13, 2002, the entire contents of which are hereby incorporated by reference.

FIELD OF THE INVENTION

The present invention relates to methods and apparatus for characterizing dynamic systems.

BACKGROUND OF THE INVENTION

Images over time, also known as video, capture our daily lives, industrial processes, environmental conditions, etc, economically and accessibly. Compression systems can significantly reduce the cost of transmitting lengthy videos. Machine vision systems can register images with accuracy of fractions of a pixel. Supervised cataloging systems can organize and annotate hours and hours of video for efficient re-use.

Many scientific and industrial applications would benefit from exploiting cost effective video systems for better measurement and quantification of dynamic processes. The current techniques require high computational and storage costs and do not allow for a real-time assessment and control of many nonlinear dynamic systems.

The present invention relates generally to digital data and signal processing. It relates more particularly, by way of example, to measuring self similarity in spatiotemporal signals to characterize (cluster, classify, represent), adaptively control their acquisition and/or storage and assign meta-data and further detail processing. It also relates to qualitative and/or quantitative assessment of spatiotemporal sensory measurements of dynamic systems.

SUMMARY OF THE INVENTION

In general, the invention features methods, e.g., machine-based methods, and apparatuses for evaluating a dynamic system. The methods can include one or more of the following steps (the steps need not be but typically are performed in the order provided herein): acquiring a plurality of images representative of the dynamic system in two or more dimensions, e.g., three dimensions; determining similarity between a selected image and one of the other images; and characterizing the selected image as a statistical function of the similarity determined with respect to it, thereby characterizing the dynamic system, e.g., characterizing the selected image as a function of similarity to one or more images acquired from a different part of the two dimensional continuum, e.g., one or both of an earlier acquired image and/or a later acquired image. In the present methods, a selected image can be compared with one or a plurality of other images, e.g., N images, wherein N is selected by the user and can be any number between 1 and the total number of images acquired, e.g., 2, 3, 4, 5, 6, 7, 8, 9, 10, 12, 14, 15, 16, 18, 20, 30, 40, 50, 60, 70, 80, 90, 100 or more, and any number in between. The two dimensions can include any dimensions, including but not limited to time, frequency spectrum, temperature, presence or absence of an attribute of the system. The determining step can include determining similarity between each image and each of the other images; and the characterizing step can include characterizing the dynamic system as a statistical function of the similarities determined with respect to the plurality of images.

Although many of the embodiments described herein refer to time as the two dimensional system it should be understood that analogous embodiments, which acquire images in other dimensions, are included in the invention.

In some embodiments of the invention, the images are acquired by an attentive acquisition or storage method including some or all of the following (the steps need not be but typically are performed in the order provided herein): acquiring images at an initial acquisition and/or storage parameterization, e.g., a first or selected parameterization; determining similarity between selected images, e.g., a more recently acquired image and at least one of the other images, e.g., one or more previously acquired images, e.g., N previously acquired images, where N is set by the user, and can be any number between one and all of the previously acquired images; characterizing the selected images as a statistical function of self-similarity; optionally comparing the characterization with a reference value, e.g., a pre-selected reference value, and optionally adjusting the acquisition or storage parameterization as a function of the self-similarity of the images. In some embodiments, the pre-selected reference value is a measure of change and/or the rate of change in the dynamic system, e.g., self-similarity.

In another aspect, the present invention features methods, e.g., machine-based methods, for evaluating a dynamic system over time. The method includes one or more of and preferably all of (the steps need not be but typically are performed in the order provided herein): acquiring a plurality of images representative of the dynamic system over time; determining similarity between a selected image and one of the other images; and characterizing the selected image as a statistical function of the similarity determined with respect to it. The determining step can include determining similarity between each image and each of the other images; and the characterizing step can include characterizing the dynamic system as a statistical function of the similarities determined with respect to the plurality of images.

In another aspect, the present invention provides methods, e.g., machine-based methods, for evaluating a dynamic system over time includes some or all of (the steps need not be but typically are performed in the order provided herein): acquiring a plurality of images representative of the dynamic system in two or more, e.g., three dimensions, such as time, space, or time and space; determining self-similarity among a representative set of images; and characterizing the set of images as a statistical function of self-similarity. The two dimensions can include any of time, space, frequency spectrum, temperature, presence or absence of an attribute of the system. In some embodiments, the determining step can include determining self-similarity between some or all of the plurality of images; and the characterizing step can include characterizing the dynamic system as a statistical function of the self-similarities determined with respect to the plurality of images. In some embodiments, the images are acquired by a method comprising acquiring images at an initial acquisition and/or storage parameterization; determining similarity between selected images; characterizing the selected images as a statistical function of self-similarity; optionally comparing the characterization with a reference value; and optionally adjusting the acquisition or storage parameterization as a function of the self-similarity of the images. In some embodiments, the pre-selected reference value is a measure of change and/or the rate of change in the dynamic system, e.g., self-similarity.

In another aspect, the present invention features methods, e.g., machine-based methods, for evaluating a dynamic system. The method includes one or all, typically all, of the following (the steps need not be but typically are performed in the order provided herein): acquiring a plurality of images representative of the dynamic system over time; determining self-similarity among a representative set of images, e.g., some or all of the images, e.g., every other image, every third image, randomly selected images, etc.; and characterizing the set of images as a statistical function of self-similarity.

In some embodiments, the determining step can include determining self-similarity between all of the plurality of images; and the characterizing step can include characterizing the dynamic system as a statistical function of the self-similarities determined with respect to the plurality of images.

In some embodiments, the images are acquired by a method, e.g., a machine-based method, comprising acquiring images at an initial acquisition and/or storage parameterization; determining similarity between selected images; characterizing the selected images as a statistical function of self-similarity; optionally comparing the characterization with a reference value; and optionally adjusting the acquisition or storage parameterization as a function of the self-similarity of the images. In some embodiments, the pre-selected reference value is a measure of change and/or the rate of change in the dynamic system, e.g., self-similarity. In some embodiments, the statistical function is a measure of entropy. In some embodiments, the statistical function is Shannon's entropy function. In some embodiments, the statistical function is:

$$H_j = -\Sigma P_j \log_2(P_j)/\log 2(n) \quad (10).$$

In some embodiments, the determining step can include determining pair-wise correlations between images, e.g., pairs of images, for example, determining pair-wise correlations between a plurality of images that comprise a window of length n images. In some embodiments, the determining step includes approximating a correlation between images separated by more than n by treatment of intervening pair-wise correlations as transitional probabilities. In some embodiments, the determining step can include determining long-term and short-term pair-wise correlations between images. In some embodiments, the determining step can include generating a matrix of the similarities. The determining step can include generating a matrix, e.g., a correlation matrix, that is any of square, normalized, comprised of probabilities, and has a diagonal of ones. In further embodiments, the method includes applying a matrix operation to the matrix in order to characterize the dynamic system.

In some embodiments of the invention, the images can be acquired from a sensor. The sensor can be any sensor known in the art, including but not limited to a video camera or other device suitable for acquisition of spatiotemporal or other signals, regardless of whether those signals represent the visual spectrum. The images can be acquired by any method known in the art, and can include any of (i) an image captured by a sensor, and (ii) a processed form of an image captured by a sensor. The processed form of the image can be any processed image known in the art, including but not limited to (i) a filtered form of an image captured by the sensor, (ii) a windowed form of the image captured by the sensor, (iii) a sub-sampled form of the image, (iv) an integration of images captured by the sensor over time, (v) an integration of a square of images captured by the sensor over time, (vi) a gradient-direction form of the image, and/or (vii) a combination thereof.

In another aspect, the invention features a method, e.g., a machine-based method, of attentively acquiring or storing images representative of a dynamic system over time. The method includes some or all, typically all, of the following steps (the steps need not be but typically are performed in the order provided herein): acquiring, at a selected acquisition and/or storage parameterization, a plurality of images representative of the dynamic system over time; determining similarity between a selected image and at least one of the other images; characterizing the images as a statistical function of self-similarity; optionally comparing the characterization with a reference value, e.g., a pre-selected reference value, and optionally adjusting the acquisition and/or storage parameterization as a function of the self-similarity of the images. In some embodiments, the acquisition parameterization can be set to drive the statistical function to a predetermined level, e.g., close to zero. In some embodiments, the acquisition parameterization can be set so that at least one or more most recently acquired images reflects a predetermined rate of change. In some embodiments, the acquisition parameterization can be set so that at least one or more most recently acquired images reflects a predetermined rate of motion, shape change, focal change, temperature change, intensity change.

Thus in some embodiments of the invention, the images are acquired by an attentive acquisition or storage method including some or all of the following (the steps need not be but typically are performed in the order provided herein): acquiring images at a first acquisition parameterization; determining similarity between a selected image, e.g., a more recently acquired image, and at least one of the other images, e.g., one or more previously acquired images, e.g., N previously acquired images, where N is set by the user, and can be any number between one and all of the previously acquired images; characterizing the images as a statistical function of self-similarity; optionally comparing the characterization with a reference value, e.g., a pre-selected reference value, and optionally adjusting the acquisition or storage parameterization as a function of the self-similarity of the images. In some embodiments, the pre-selected reference value is a measure of change and/or the rate of change in the dynamic system, e.g., self-similarity.

In some embodiments, the acquisition parameterization includes, but is not limited to, any of acquisition rate, exposure, aperture, focus, binning, or other parameter.

In some embodiments, at least selected ones of the acquired images are buffered for potential processing. In some embodiments, at least selected ones of the buffered images are processed. In some embodiments, at least selected ones of the acquired images are stored.

In another aspect, the present invention features a method, e.g., a machine-based method, of determining movement of an object. The method includes some or all of the following (the steps need not be but typically are performed in the order provided herein): acquiring a plurality of images of the object; selecting a window of interest in a selected image, the selecting step including performing at least one autocorrelation between a candidate window and a region in which the candidate window resides in the selected image; identifying movement of the object as function of a cross-correlation between the window of interest and corresponding window in another of the images, e.g., by performing at least one auto-correlation between a candidate corresponding window in the another image and a region in that image in which that candidate window resides, optionally by finding a maxima in the cross-correlation. The images can be acquired by a method described herein, including a method including attentive acquisition or storage, wherein the storage or acquisition parameterizations are optionally adjusted as a function of the self-similarity of some subset of the acquired images.

In another aspect, the present invention provides a method, e.g., a machine-based method, for determining movement of an object. The method includes some or all of the following (the steps need not be but typically are performed in the order provided herein): acquiring a plurality of images of the object; selecting a window of interest in a selected image, the selecting step including performing at least one autocorrelation between a candidate window and a region in which the candidate window resides in the selected image; performing at least one autocorrelation on a window that corresponds to the window of interest in another of the images; and identifying movement of the object as function of displacement of the characterizing portions of the autocorrelations, e.g., by matching at least characterizing portions of the autocorrelations. In some embodiments, the images are acquired by a method including attentive acquisition or storage, wherein the storage or acquisition parameterization are optionally adjusted as a function of the self-similarity of some subset of the acquired images.

In another aspect, the present invention provides a method, e.g., a machine-based method, of analyzing motion in a plurality of images. The method includes some or all of the following (the steps need not be but typically are performed in the order provided herein): acquiring a plurality of images, selecting a plurality of windows of interest in a selected image, the selecting step including performing, for each window of interest, at least one autocorrelation between a candidate window and a region in which the candidate window resides in the selected image; and identifying motion vectors as function of a cross-correlation between each window of interest and a corresponding window in another of the images, e.g., by performing at least one autocorrelation between a candidate corresponding window in another image and a region in that image in which that candidate window resides, and optionally finding a maxima in the cross-correlations. In some embodiments, the images are acquired by a method including attentive acquisition or storage, wherein the storage or acquisition parameterizations are optionally adjusted as a function of the self-similarity of some subset of the acquired images. In some embodiments, the method also includes segmenting the image as a function of the motion vectors, e.g., by finding one or more sets of motion vectors with minimum square distances with respect to one another.

In another aspect, the invention provides a method, e.g., a machine-based method of analyzing motion in a plurality of images. The method includes some or all, typically all, of the following (the steps need not be but typically are performed in the order provided herein): acquiring a plurality of images of the object; selecting a plurality of windows of interest in a selected image, by performing, for each window of interest, at least one autocorrelation between a candidate window and a region in which the candidate window resides in the selected image; for each window of interest, performing at least one autocorrelation on a respective corresponding window in another image; and identifying motion vectors as functions of displacements of the characterizing portions the autocorrelations of each window of interest and the corresponding window in the another image, e.g., by matching at least characterizing portions of the autocorrelations. In some embodiments, the images are acquired by a method including acquiring images at an initial acquisition and/or storage parameterization; determining similarity between selected images; characterizing the selected images as a statistical function of self-similarity; optionally comparing the characterization with a reference value; and optionally adjusting the acquisition or storage parameterization as a function of the self-similarity of the images. In some embodiments, the pre-selected reference value is a measure of change and/or the rate of change in the dynamic system, e.g., self-similarity.

In some embodiments, the method also includes segmenting the image based on self-similarity, e.g., as a function of the motion vectors, e.g., by finding one or more sets of motion vectors with minimum square distances with respect to one another.

In the methods of the present invention, the dynamic system is a dynamic biological system including at least one biological unit as defined herein. In some embodiments, the biological unit is undergoing morphological change, e.g., cell differentiation, spreading, contraction, phagocytosis, pinocytosis, exocytosis, growth, death, division, and polarization.

In some embodiments of the present invention, the dynamic biological system is in a single well, e.g., one or more wells, e.g., one or more wells of a dish having multiple wells. In some embodiments, the biological units are on an addressable array, e.g., a cell chip, a multi-well plate, e.g., 96 wells, etc.

In some embodiments of the present invention, the plurality of images representative of the dynamic system are images of a single biological unit.

In some embodiments, the biological unit is motile.

In some embodiments, the biological unit is undergoing cell division, e.g., undergoing meiosis or mitosis.

In some embodiments, the biological unit is undergoing cell adherence, e.g., is adjacent to, in contact with, or adhered to a second entity during image acquisition. The second entity can be a surface or another biological unit.

In some embodiments, the biological units are subcellular objects such as proteins, nucleic acids, lipids, carbohydrates, ions, or multicomponent complexes containing any of the above. Further examples of subcellular objects include organelles, e.g., mitochondria, Golgi apparatus, endoplasmic reticulum, chloroplast, endocytic vesicle, exocytic vesicles, vacuole, lysosome, nucleus. In some embodiments, the biological unit is labeled, e.g., with magnetic or non-magnetic beads, antibodies, fluorophores, radioemitters, and labeled ligands. The radioemitter can be an alpha emitter, a beta emitter, a gamma emitter, or a beta- and gamma-emitter. The label can be introduced into the biological unit using any method known in the art, including administering to cells or ogranisms, by injecting, incubating, electroporating, soaking, etc. Labelled biological units can also be derived synthetically, chemically, enzymatically, or genetically, e.g., by creation of a transgenic animal expressing GFP in one or more cells, or expressing a GFP-tagged protein in one or more cells. The label can also be chemically attached, e.g., a labelled antibody or ligand.

In one aspect, the present invention provides a method, e.g., a machine-based method, for evaluating an attribute of a biological unit over time. The method includes, some or all, typically all, of the following (the steps need not be but typically are performed in the order provided herein): providing a plurality of images representative of the biological unit over time; evaluating the similarity between a selected image and one of the other images to determine a pairwise similarity measurement, e.g., by computed pairwise correlations or by employing fourier optics; generating a self-similarity matrix comprising the pairwise similarity measurement; and characterizing the biological unit as a function of the self-similarity matrix, e.g., by generating eigenvalues and/or entropic indices from the self-similarity matrix, thereby evaluating the attribute of the biological system. In some embodiments, the images are acquired by a method acquiring images at an initial acquisition and/or storage parameterization; determining similarity between selected images; characterizing the selected images as a statistical function of self-similarity; optionally comparing the characterization with a reference value; and optionally adjusting the acquisition or storage parameterization as a function of the self-similarity of the images. In some embodiments, the pre-selected reference value is a measure of change and/or the rate of change in the dynamic system, e.g., self-similarity. In some embodiments, similarity is determined between the selected image and all of the other images.

In some embodiments, the attribute is one or more of the following: cell morphology, cell migration, cell motility, cell death (e.g., necrosis or apoptosis), cell division, binding to or interacting with a second entity, organismal development, organismal motility, organismal morphological change, organismal reproduction, and the movement or morphological change of individual tissues or organs within an organism.

In some embodiments, the method includes selecting a plurality of images and evaluating the similarity between pairs of images to determine a pairwise similarity measurement, e.g., by computed pairwise correlations or by employing fourier optics; and generating a self-similarity matrix comprising the pairwise similarity measurements.

In some embodiments, the method includes selecting a plurality of the images and evaluating the similarity between all the images to determine a pairwise similarity measurement, e.g., by computed pairwise correlations or by employing fourier optics, and generating a self-similarity matrix comprising the pairwise similarity measurements.

In another aspect, the invention provides methods for evaluating an attribute of a dynamic biological system over time. The method includes some or all, typically all of the following (the steps need not be but typically are performed in the order provided herein): providing a plurality of images representative of the dynamic biological system; generating a motion field from at least two images; and characterizing the dynamic biological system as a statistical function of the motion field, thereby evaluating the dynamic biological system. In some embodiments, the dynamic biological system is characterized using a statistical analysis of motion vectors, by evaluating direction and/or velocity in the dynamic biological system, and/or by determining the distribution of direction or velocity in the dynamic biological system.

In some embodiments, the method includes performing a statistical analysis of velocity as a function of direction and/or a statistical analysis of direction as a function of velocity.

In some embodiments, the method includes detecting one or more moving objects, e.g., biological units, in the image, e.g., based on motion vector colocomotion. In some embodiments, the method includes determining the direction or velocity of the moving object as a function of colocomoting motion vectors. In some embodiments, the method includes performing a statistical analysis of velocity as a function of direction and/or a statistical analysis of direction as a function of velocity.

In some embodiments, the method also includes determining the center of motion for a moving object. In some embodiments, the method includes determining the directional persistence of the moving object, determining the direction or velocity of the center of motion of the moving object, and determining the direction and velocity of the center of motion of the moving object. The method can also include performing a statistical analysis of velocity as a function of direction, and/or statistical analysis of direction as a function of velocity. In some embodiments, the method also includes determining the distribution of direction or velocity of a moving object.

In some embodiments, the method also includes establishing a bounding box for a moving object, e.g., for each moving object. The bounding box can correspond exactly to the maximum dimensions of the object. The bounding box can correspond to the maximum dimensions of the object plus a pre-selected factor. The size of the bounding box can vary with the self-similarity of the object. In some embodiments, the method also includes analyzing the area within the bounding box, e.g., by applying image segmentation based on raw intensity, texture, and/or frequency. In some embodiments, the method also includes evaluating an attribute of the object.

In some embodiments, the method also includes evaluating an attribute of the object, for example, by a method including some or all, typically all, of the following: providing a plurality of images of the object; evaluating the similarity between a plurality of images of the object; and characterizing the object as a function of the similarity between the images, e.g., by generating a self-similarity matrix. In some embodiments, the images of the object are acquired by a method comprising acquiring images at a first acquisition parameterization; determining similarity between a selected image and at least one of the other images; characterizing the images as a statistical function of self-similarity; and the acquisition parameterization is adjusted as a function of the self-similarity of the images. In some embodiments, the plurality of images is a pair of images.

In some embodiments, the plurality of images of the object comprises images of the area within the bounding box. In some embodiments, the method also includes calculating the dimensions of the object, e.g., a major axis and a minor axis. In some embodiments, the method also includes characterizing the shape of the object as a function of the major axis and the minor axis and/or generating eigenvalues.

Any of the methods described herein can be applied to the characterization of a dynamic biological system. Accordingly, in another aspect, the invention provides methods for characterizing a dynamic biological system comprising a biological unit, e.g., a plurality of biological units, e.g., independently selected from one or more of cells, tissue, organs, and unicellular organisms, multicellular organisms. The method includes some or all, typically all, of the following (the steps need not be but typically are performed in the order provided herein): providing the dynamic biological system; acquiring a plurality of images representative of the dynamic biological system in two dimensions; determining self-similarity between a representative set of the images; and characterizing the set of images as a statistical function of self-similarity, thereby characterizing the dynamic biological system. In some embodiments, the images are acquired by a method comprising acquiring images at an initial acquisition and/or storage parameterization; determining similarity between selected images; characterizing the selected images as a statistical function of self-similarity; optionally comparing the characterization with a reference value; and optionally adjusting the acquisition or storage parameterization as a function of the self-similarity of the images. In some embodiments, the pre-selected reference value is a measure of change and/or the rate of change in the dynamic system, e.g., self-similarity. In some embodiments, the plurality of images is a pair of images.

In some embodiments, the method provides information regarding one or more attributes of the biological unit. In some embodiments, the biological unit is a cell, and in some embodiments, the one or more attributes can be cell motility, cell morphology, cell division, cell adherence. In some embodiments, the biological unit is an organism. In some embodiments, the one or more attributes can be organismal motility, organismal morphological change, organismal reproduction, and the movement or morphological change of individual tissues or organs within an organism.

In some embodiments, the dynamic biological system is manipulated, e.g., by altering temperature, viscosity, shear stress, cell density, composition of media or surfaces contacted, electrical charge, gene expression, protein expression, adding one or more other biological units of the same or different type, or by adding or removing or one or more treatments. In some embodiments, the manipulation is addition or removal of a treatment, e.g., one or more test compounds, e.g., small molecules, nucleic acids, proteins, antibodies, sugars and lipids. In some embodiments, a plurality of dynamic biological system is each exposed to a different manipulation. In some embodiments, a redundant set of dynamic biological systems is exposed to a redundant set of manipulations; for example, if a first set includes six dynamic biological systems, and the six dynamic biological systems are each exposed to a different manipulation, a redundant set would be a second set of six dynamic biological systems exposed to the same six manipulations as the first set, resulting in the exposure of two dynamic biological systems to each test compound.

In some embodiments, the method includes acquiring a plurality of images representative of the dynamic biological system at one or more of the following points: prior to, concurrently with, and subsequent to the manipulation. In some embodiments, the method includes evaluating the effect of a manipulation, e.g., a treatment, on one or more attributes of the one or more biological units.

The methods of the invention can be combined with other methods of evaluating a dynamic biological system, e.g., the effect of one or more drug candidates on a dynamic biological system can be analyzed by a method described herein in combination with a second method. The second method can be a method of the invention or another method. The methods can be applied in any order, e.g., a method of the invention can be used to confirm a "hit" candidate compound identified in a prior screen which does not use a method of the invention.

In some embodiments, the biological unit is a cell. In some embodiments, the attribute can be cell motility, cell morphological change, cell adherence, and cell division.

In some embodiments, the biological unit is an organism. In some embodiments, the attribute can be consisting of organismal motility, organismal morphological change, organismal reproduction, and the movement or morphological change of individual tissues or organs within an organism.

In some embodiments, the dynamic biological system includes a plurality of biological units that are all similar or include two or more different biological units. The biological units can differ genetically e.g., as a result of gene deletion or duplication, targeted mutation, random mutation, introduction of additional genetic material, epigenetically, phenotypically or in developmental stage. The biological units can also differ as a result of exposure to a manipulation, e.g., a treatment, e.g., a test compound.

In some embodiments, the method also includes evaluating the effect of the manipulation on an attribute of a biological unit, and selecting the manipulation for further analysis. The further analysis can be by a method described herein, or by a different method, e.g., a method other than a method of evaluating a dynamic biological system comprising providing the biological unit; acquiring a plurality of images representative of the dynamic system in two dimensions; determining self-similarity between a representative set of images; and characterizing the images as a statistical function of self-similarity.

In some embodiments, wherein the manipulation is the addition or removal of a treatment, the further analysis can be by a high throughput or parallel screen, e.g., a screen wherein a number of dynamic biological systems, e.g., at least 10, $10^2$, $10^3$, $10^4$, $10^5$, $10^6$, $10^7$, $10^8$, $10^9$, $10^{10}$ or more are manipulated, e.g., exposed to a treatment such as a test compound, e.g., a candidate drug, e.g., a candidate for inhibition or promotion of an attribute, e.g., at least 10, $10^2$, $10^3$, $10^4$, $10^5$, $10^6$, $10^7$, $10^8$, $10^9$, $10^{10}$ or more different manipulations, e.g., treatments, e.g., test compounds. Thus, in one example, each of a plurality, e.g., at least 10, $10^2$, $10^3$, $10^4$, $10^5$, $10^6$, $10^7$, $10^8$, $10^9$, $10^{10}$ similar dynamic biological systems, e.g., comprising cells, are exposed to a different test compound, e.g., a different chemical compound. The test compound can come from any source, including various types of libraries, including random or nonrandom small molecule, peptide or nucleic acid libraries or libraries of other compounds, e.g., combinatorially produced libraries. In many cases as discussed above a plurality of the same or similar dynamic biological systems and many different drug candidates are tested, or alternatively different dynamic biological systems, e.g., genetically different, e.g., mutants, are test with a single drug. The screen can be for evaluating a test compound for its ability to interact with a biological unit, receptor or other target, e.g., a screen is selected based on combinatorial chemistry, computer-based structural modeling and rational drug design, determining the binding affinity of the test compound, phage display, and drug western. Such screens can comprise contacting a plurality of members of a library, e.g., a library of compounds having variant chemical structures, with a plurality of dynamic biological systems and selecting a library member having a preselected property, e.g., the ability to affect an attribute of a biological unit.

In some embodiments, the manipulation, e.g., a treatment, e.g., a test compound, was identified in prior screen, e.g., a screen performed prior to the method of the present invention. The prior screen can be by a method described herein or by a different method, e.g., a method other than a method of evaluating a dynamic biological system comprising providing the biological unit; acquiring a plurality of images representative of the dynamic system in two dimensions; determining self-similarity between a representative set of images; and characterizing the images as a statistical function of self-similarity. Examples of such screens include those which are based on binding of a ligand to a target.

In another aspect, the invention provides methods for optimizing the effect of a test compound on an attribute of a biological unit. The method includes some or all, typically all, of the following (the steps need not be but typically are performed in the order provided herein): selecting a first test compound; exposing a dynamic biological system to the first test compound; acquiring a plurality of images representative of the dynamic biological system in two dimensions; determining self-similarity between a representative set of the images; characterizing the set of images as a statistical function of self-similarity; providing a next generation test compound; exposing a dynamic biological system to the next generation test compound; acquiring a plurality of images representative of the dynamic biological system in two dimensions; determining similarity between a representative set of the images; and characterizing the set of images as a statistical function of self-similarity. The activity of the first and the next generation compound can be compared, e.g., with one another of with reference value to evaluate the compound. The steps of the method can be repeated with successive next generation compounds, e.g., to optimize the structure of a test compound, e.g., to maximize the effect of the test compound on an attribute.

In some embodiments, the first test compound and the next generation compound are selected from a database of compounds of known chemical structure. In some embodiments, the next generation compound is a variant, e.g., a structural variant, of the first test compound. For example, a particular moiety or functional group can be altered once or serially to identify optimized structures. In some embodiments, more than one moiety or functional groups can be varies, simultaneously or serially.

In some embodiments, the method also includes selecting a first treatment; providing a next generation treatment; exposing a dynamic biological system to the next generation treatment; acquiring a plurality of images representative of the dynamic biological system in two dimensions; determining self-similarity between a representative set of the images; and characterizing the plurality of images as a statistical function of self-similarity.

In some embodiments, the method also includes acquiring a plurality of images representative of the dynamic biological system at one or more of the following points: prior to, concurrently with, and subsequent to the exposure to the next generation treatment.

In another aspect, the invention also provides a method, e.g., a machine-based method, for determining the relationship between a property of a test compound, or a series of test compounds, and the ability to modulate an attribute of a biological unit. The method includes some or all, typically all, of the following (the steps need not be but typically are performed in the order provided herein): providing a first test compound having a first property, e.g., a first chemical structure or property, e.g., a first moiety or structural group at a selected position; exposing a dynamic biological system comprising a biological unit to the first test compound; analyzing the dynamic biological system by a method described herein, e.g., by acquiring a plurality of images representative of the dynamic biological system in two dimensions; determining self-similarity between a representative set of the images; characterizing the set of images as a statistical function of self-similarity; providing a second test compound having at least one property similar to a property of the first treatment and at least one property that differs, e.g., a moiety or functional group, e.g., an R group is varied between the first and second compound; exposing a dynamic biological system comprising a biological unit to the second test compound; analyzing the dynamic biological system by a method described herein, e.g., by acquiring a plurality of images representative of the dynamic biological system in two dimensions; determining self-similarity between a representative set of the images; characterizing the set of images as a statistical function of self-similarity; and correlating the similar property of the first and second test compounds with an effect on one or more attribute.

In some embodiments, the property of the test compound is selected from the group consisting of chemical structure, nucleic acid sequence, amino acid sequence, phosphorylation, methylation, sulfation, nitrosylation, oxidation, reduction, affinity, carbohydrate structure, lipid structure, charge, size, bulk, isomerization; enantiomerization; and rotational property of a selected moiety, or any physical or chemical property of the structure. For example, a moiety is present on a scaffold and the moiety is varied allowing analysis of the ability of the moiety, or other moiety at the same position, to affect an attribute.

In another aspect, the present invention provides a method, e.g., a machine-based method, for evaluating or selecting a target, e.g., to mediate a selected attribute of a biological unit. The method includes some or all, typically all of the following (the steps need not be but typically are performed in the order provided herein): providing a first test compound, e.g., a ligand, for a first target, e.g., a receptor; contacting a dynamic biological system comprising a biological unit with the first test compound; and performing a method described herein, e.g., a method including: (1) acquiring a plurality of images representative of the dynamic biological system in two dimensions; (2) determining self-similarity between a representative set of the images; and (3) characterizing the set of images as a statistical function of self-similarity; thereby providing a value for a parameter related to the effect of the first test compound on the selected attribute; providing a second test compound, e.g., a ligand, for a second target, e.g., a different receptor; contacting one or more biological units with the second test compound; and performing a method a method described herein, e.g., a method including: (1) acquiring a plurality of images representative of the dynamic biological system in two dimensions; (2) determining self-similarity between a representative set of the images; and (3) characterizing the set of images as a statistical function of self-similarity, thereby providing a value for a parameter related to the effect of the second test compound on the selected attribute; and comparing the parameters and selecting the test compound having the desired effect on the attribute, thereby selecting a target.

In one aspect, the invention provides a method, e.g., a machine-based method, for evaluating the activity of a gene. The method includes some or all, typically all, of the following (the steps need not be but typically are performed in the order provided herein): the method comprising: providing a first reference biological unit or plurality thereof; providing a second biological unit or plurality thereof wherein the activity of the gene is modulated as compared to the first biological unit, and performing a method described herein, e.g., a method comprising: (1) acquiring a plurality of images representative of the dynamic biological system in two dimensions; (2) determining self-similarity between a representative set of the images; and (3) characterizing the set of images as a statistical function of self-similarity, thereby evaluating the activity of the gene.

In some embodiments, the gene is modulated by directed or random mutagenesis. In some embodiments, a plurality of genes are modulated, e.g., by random mutagenesis. In some embodiment, the plurality of genes are selected from the results of an expression profile experiment, e.g., a gene chip experiment or are expressed in or known to be associated with a disease state.

In some embodiments, the plurality of genes are modulated in a plurality of biological units and/or dynamic systems. In some embodiments, a unique gene is modulated in each of a plurality of biological units and/or dynamic systems.

In some embodiments, the method includes manipulating the dynamic system and evaluating the effect of the manipulation on the activity of the gene.

In another aspect, the invention provides a method, e.g., a machine-based method, of evaluating the interaction of a biological unit with a surface. The method includes some or all, typically all, of the following (the steps need not be but typically are performed in the order provided herein): providing a dynamic biological system comprising a biological unit;

contacting the dynamic biological system with a surface; and performing a method described herein, e.g., a method comprising: (1) acquiring a plurality of images representative of the dynamic biological system in two dimensions; (2) determining self-similarity between a representative set of the images; and (3) characterizing the set of images as a statistical function of self-similarity, thereby evaluating the interaction of the biological unit with the surface.

In some embodiments, the surface is uniform. In some embodiments, the surface is variable, e.g., comprises pores, openings, concavities, convexities, smooth areas, and rough areas, changes in composition, changes in charge, and/or the presence or absence of a test compound, e.g., the test compound is present in a gradient.

In some embodiments, the interaction can be adherence to the surface, movement across the surface, release from the surface; deposit or removal of a material on the surface, and infiltration of pores or openings.

In another aspect, the invention provides a method, e.g., a machine-based method, for evaluating the propensity of one or more biological units to interact with, e.g., infiltrate a structure, e.g., the surface of a prosthetic device, e.g., stainless steel, titanium, ceramic, and synthetic polymer. The method includes some or all, typically all, of the following (the steps need not be but typically are performed in the order provided herein): providing one or more biological units; providing a structure, e.g., a piece of a prosthetic device; performing a method comprising: (1) acquiring a plurality of images representative of the dynamic biological system in two dimensions; (2) determining self-similarity between a representative set of the images; and (3) characterizing the set of images as a statistical function of self-similarity; thereby evaluating the propensity of the biological units to infiltrate a structure. In some embodiments, the method also includes exposing the biological units to a test compound and evaluating the effect of the test compound on the propensity of the biological units to infiltrate the structure.

In another aspect, the invention provides a method, e.g., a machine-based method of evaluating the interaction between a biological unit and a second entity, e.g., bone cells, tissues, e.g., transplant tissue, e.g., allogeneic, autologous, or xenogeneic tissue. In some embodiments, the method includes providing one or more biological units; providing a second entity; performing a method described herein, e.g., a method including: comprising: (1) acquiring a plurality of images representative of the dynamic biological system in two dimensions; (2) determining self-similarity between a representative set of the images; and (3) characterizing the set of images as a statistical function of self-similarity, thereby evaluating the interaction of the biological units and the second entity.

In another aspect, the invention provides a method, e.g., a machine-based method, of evaluating a test compound. The method includes some or all, typically all of the following: providing a first biological unit; providing a second biological unit that is the same as the first biological unit or plurality thereof wherein the first and second biological units are preferably the same; contacting the second biological agent with the test compound; performing a method described herein, e.g., a method including: acquiring a plurality of images representative of the dynamic biological system in two dimensions; determining self-similarity between a representative set of the images; and characterizing the set of images as a statistical function of self-similarity; and comparing the attributes of the biological unit in the presence and absence of the test compound, thereby evaluating the test compound. In some embodiments, the method also includes: providing a second test compound; contacting the first biological unit with the second test compound; performing a method described herein, e.g., a method including: (1) acquiring a plurality of images representative of the dynamic biological system in two dimensions; (2) determining self-similarity between a representative set of the images; and (3) characterizing the set of images as a statistical function of self-similarity; and comparing the attributes of the biological unit in the presence and absence of the test compound.

The invention includes the systems and apparatus described herein. Accordingly, in one aspect, the invention provides an apparatus that includes some or all, typically all, of the following: an acquisition system, e.g., a sensor, configured to acquire images, e.g., spatiotemporal or other signals, representative of a dynamic system at an adjustable parameterization; a storage device configured to store the images at an adjustable parameterization; and a computing device configured to analyze similarities between the images (e.g., images acquired by the acquisition system). The apparatus can also include a display device. In some embodiments, the apparatus also includes buffering means for potential processing of one or more images.

In some embodiments, the computing device is further configured to adjust the acquisition parameterization of the acquisition device and/or the storage parameterization of the storage device as a statistical function of the similarity between images, e.g., includes setting the acquisition parameterization to drive the statistical function to a predetermined level, e.g., setting the acquisition and/or storage parameterization so that at least one or more most recently acquired images reflects a predetermined rate of change, e.g., setting the acquisition parameterization so that at least one or more most recently acquired images reflects a predetermined rate of motion, shape change, focal change, temperature change, or intensity change. The acquisition parameterization can be, but is not limited to, acquisition rate, exposure, aperture, focus, binning, or other parameter. The storage parameterization can be, but is not limited to, image labeling.

In another aspect, the invention features a database. The database includes a plurality of records wherein each record includes at least one of the following:

a. data on the identity of a biological unit;
  b. data on an attribute of the biological unit; and
  c. data on a the effect of one or more manipulation, e.g., a treatment, e.g., the administration of a test compound, on the attribute.

In some embodiments, the data on the identity of the biological unit includes genotypic and phenotypic information, e.g, information regarding the presence, absence, spatial location, or temporal expression of a gene, and/or information regarding the presence or absence of one or more mutations.

In some embodiments, the phenotypic data includes one or more of cell type, organism type, cell status, and age.

In some embodiments, the database includes at least two records, and the manipulation in each of the records differs from the other record. In some embodiments, the manipulation is administration of a test compound and in one record the preselected factor includes administration of the test compound and in the other record the test compound is not administered or is administered at a different dose. In some embodiments, the database includes at least two records, and at least one manipulation in each of the records differs from the other record. In some embodiments, at least one manipulation in the records differs and at least one of the other manipulations is the same.

In another aspect, the invention provides a method for identifying an unknown target, e.g., a gene, protein or other cellular or extracellular target. The method includes some or all, typically all, of the following: providing a database described herein, including at least a first record having data about the effect of a first manipulation on a attribute, where the target of the first test compound is known; and at least a second record having data about the effect of a second manipulation on an attribute, where the target of the second manipulation is unknown; and comparing the data in the first record to the data of the second record.

In some embodiments, the database is in computer readable form.

Methods and apparatus are described herein to assess self-similarity over the entire length of a spatiotemporal signal as well as on a moving temporal window. In one aspect, a real time signal acquisition system is provided in which, self-similarity in a moving temporal window enables adaptive control of acquisition, processing, indexing, and storage of the said spatiotemporal signal. In another aspect, such system as provided in which self-similarity in a moving temporal window provides means for detecting unexpected. In yet another aspect such system as provided in which, self-similarity in over the entire length of a spatiotemporal signal or a moving or stationary window, provides means to characterize, classify, and compare dynamic processes viewed.

A method for measuring self-similarity of a spatiotemporal signal in systems according to some aspects of the invention includes steps of assuring and maintaining of acquisition at or near the rate of dominant motion in the visual scene as to assure as near linear relationship between any two successive frames or times of acquisition. Further processing includes comparison of near and long range, distance in time, frames. Said comparisons for a temporal window, length greater than one can be arranged in a matrix arrangement. In accordance to further aspects of this invention the said matrix is used to compute self-similarity for the respective temporal window.

Further aspects of the invention provide such methods and apparatus that use an unsupervised learning algorithm to classify statistical dependence of one or more sections of the acquired spatiotemporal signal on any other section of said signal uncovering periodic, regularities, or irregularities in the scene. Said algorithm can be unsupervised insofar as it requires no tuned or specific template or noise model to measure self-similarity and thus describe the visual dynamics.

Further aspects of the invention provide for efficient, cost effective and salient computation of cross matches between frames separated by long range of temporal distance by utilizing the persisted operated model of linearity or near linearity of successive frames and geometric mean of cross-matches in the frequency domain.

Further aspects of the invention provide such methods and apparatus that prescribe an efficient, cost effective, and salient measurement of visual self-similarity across indefinitely long acquisition duration. Visual self-similarity measured, according to related aspects of the invention, can be used to characterize, quantify, and compare the underlying dynamic system to the best representation of the its visual projection.

Further aspects of the invention provide automatic methods for recording of exemplary templates of a acquisition session. A frame is labelled an exemplary template when it is kernel of a sequence of frames acquired consecutively whose incremental temporal integration forms a linear set with any and every frame in the sequence. A related aspect of this invention is its providing means to recognize novel and unpredictable frame or sequence of frames by their nonlinear relationship with the rest of the acquired frames.

Related aspects of the invention provide such methods and apparatus that provide predictive feedback to the acquisition sub-system as to appropriateness of the parameters) controlling temporal sampling, e.g., in the case of video acquisition, typically, frame-rate and exposure.

An information theoretic mechanism can be used, according to still further aspects of the invention, to compute whole or self-symmetry measurement for a group of frames in the buffer. The whole characterization, according to related aspects of the invention, can be tracked and matched to characterizations generating a predictive signal for adjustment of acquisition parameters for frame-rate and exposure as well as identifying frame sequences of interest.

Further aspects of this invention provide such methods and apparatus that prescribe Fourier optics system for computation of cross matches between successive frames.

Further aspects of the invention provide methods and apparatus as described above that utilize conventional or other acquisition devices to measure motion signatures indicating speed and type of dominant characterizing motion in view.

Still further aspects of the invention provide such methods and as are operationally customized via a script that encapsulates users storage and indexing preferences.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the. invention will be apparent from the following detailed description, and from the claims.

BRIEF DESCRIPTION OF THE DRAWINGS

FIG. 10 is diagram of the overlap between cellular attributes and therapeutic areas.

DETAILED DESCRIPTION

The present invention provides methods and apparatus for characterizing dynamic systems. Embodiments of the invention are further described in the following description and examples, which do not limit the scope of the invention described in the claims.

Figure 1:
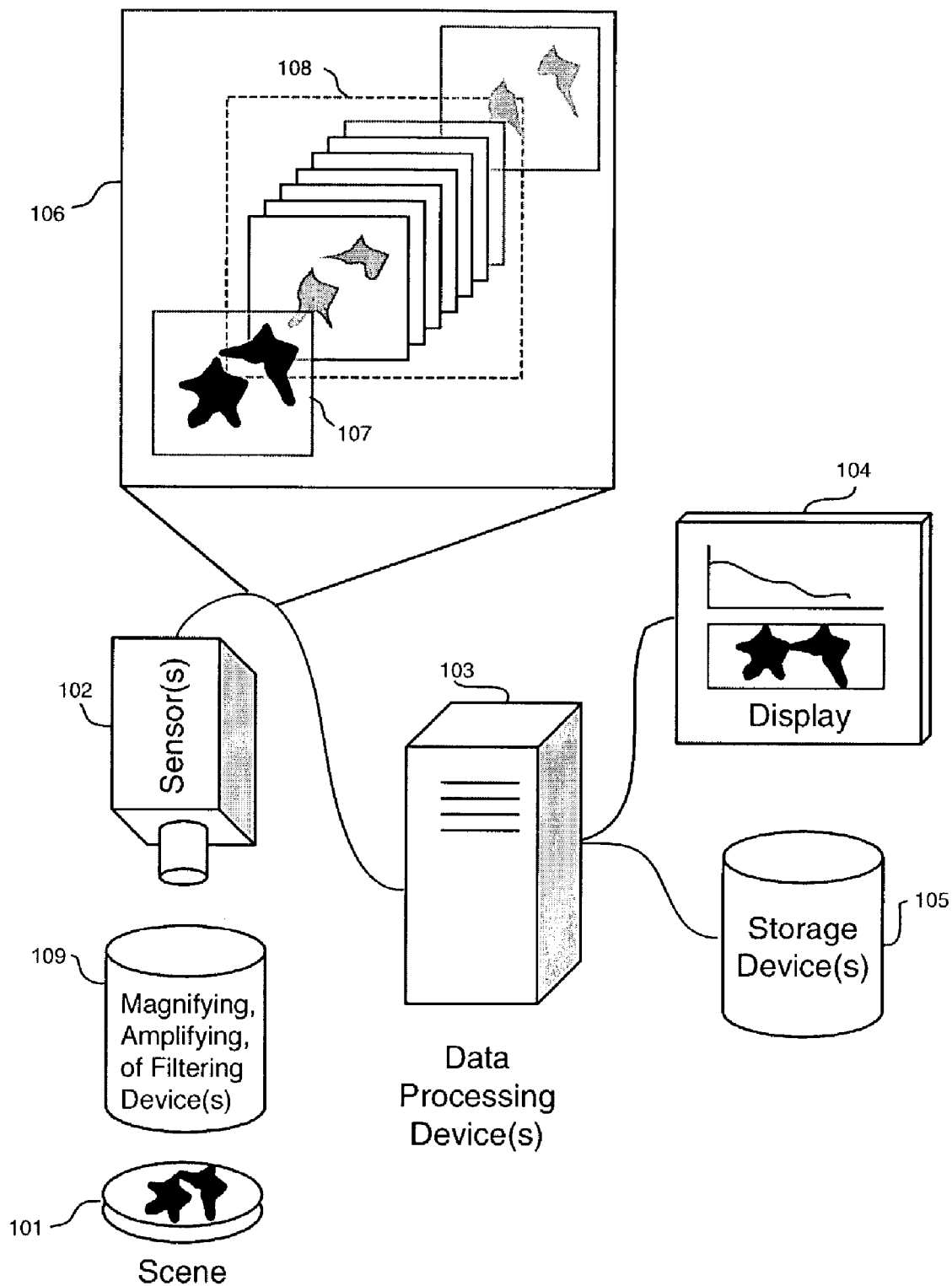
FIG. 1 is a block diagram of an embodiment of the apparatus.

A block diagram of an embodiment of the apparatus for acquisition, compression and characterization of spatiotemporal signals includes a sensor(s) (102), data processing device(s) (also known as computing device(s)) (103), storage device(s) (105) and display (104) devices as shown in FIG. 1.

Data processing device(s) (103) includes one or more modules (fabricated in software, hardware or a combination thereof) executing on one or more general or special purpose digital data processing or signal processing device(s) in accordance with the teachings below.

The sensor (102) can be one or more video cameras (of the conventional variety or otherwise) or other devices suitable for acquiring spatiotemporal, thermal or other signals (regardless of whether those signals represent the visible light spectrum) representative of a system to be subjected to characterization, indexing or other processing in accordance with the teachings hereof. In one embodiment, the sensor can be monitoring a dynamic system as defined below. However, the teachings herein may also be applied to the monitoring of a non-dynamic system, such as in cases where a system is thought to have the potential to be dynamic, or when a comparison is to be made between systems where at least one system is thought to have the potential to be dynamic.

The sensor can be parameterized or tuned to receive a particular band or bands of frequency, such as might be required, by way of example, for fluorescent imaging techniques. Suitable devices (109) can be inserted between the scene (101) and the sensor to amplify, magnify, or filter or otherwise manipulate the information in the scene prior to its acquisition by the sensor. The output of the sensor (107) is referred to hereafter as an "image" or a "frame," regardless of the type of sensor and whether or not the image is a direct representation of sensory data, reconstructed sensory data or synthetic data. Element 102 can alternatively be a source of previously acquired video, spatiotemporal or other signals representative of a dynamic system. For the sake of convenience and without loss of generality, element 102 is hereafter referred to as "sensor."

The sensor (102) can also be, by way of non-limiting example, a source for a multitude of stored frames in two or more dimensions, such as a collection of photographic images, and an embodiment of the present invention can be used to cluster said frames into classes corresponding to measurements of self-similarity, regardless of whether any or all of the frames were acquired from the same system or scene.

Element 102 can also be, by way of further non-limiting examples, two or more cameras or other sensors in a stereo or other multi-source image acquisition system; one or more sensors that include one or more filtering devices between the scene and the signal acquisition device; or an ensemble of sensory modalities, each represented by one or more sensors.

A dynamic system is defined as a system in which values output by a sensor monitoring the system vary across time. A dynamic system can be a system that is "naturally" dynamic, i.e., a system that changes without external perturbation, and would most commonly be viewed by a stationary sensor. A dividing cell, for example, would be a dynamic system. However, a system can be induced to produce varying output from the sensor through a variety of means, including: perturbing or manipulating an otherwise non-changing system being monitored by a stationary sensor, such as would happen when positioning and orienting a semiconductor wafer for photolithography or placing a chemoattractant near a stationary cell; perturbing a sensor that is monitoring a non-changing system, such as would happen when panning a video camera over a document or large photograph; perturbing the signal prior to its output by the sensor through electronic, programmatic or other means; or any combination of perturbations and natural dynamism that would lead to variance in output from the sensor. For the sake of convenience, images are said to be representative of a dynamic system, or particularly a dynamic system over time, regardless of whether the system is inherently dynamic or made to appear dynamic by virtue of imaging modality or any induced perturbation.

Images can be processed before analysis. Processing can include filtering, windowing, sub-sampling, integration, integration of the squares and gradient detection. Images, processed or unprocessed, will be referred to hereafter simply as "images" or "frames". Images and frames are represented by an array of values representing intensity. A frame or image sequence (106) is a set of arrays of values representing sensory information, where each frame is or could be related to every other frame in some way. In some embodiments, this relationship may be by virtue of the fact that the frames were acquired sequentially by a single sensor, though in other modes this relationship may be through the sharing of similarities in shape, color, frequency or any of a number of other attributes. The sequence may also be defined through ordered or random selection of a subset of frames from a larger set. Frame rate defines the number of frames captured in a unit of time. Exposure time is the length of time a sensor is exposed to the scene (101) while acquiring the data that produces a single frame. Frame rate and exposure time have their usual definitions in the field of visual signal processing. Other sensory modalities have analogous variables.

The illustrated reporting module (203) is comprised of storage media (dynamic, static or otherwise) with suitable capacity for at least temporary storage of video or other spatiotemporal sequences that may be acquired, compressed, characterized and/or indexed by the illustrated embodiment. In FIG. 1, by way of non-limiting example, the storage device (105) is depicted as a disk drive.

The acquisition process starts with the establishment of an initial or first acquisition rate and an attention window (108) size. These parameters can be specified manually or programmatically, based on system capabilities, empirical knowledge about the sensor or the scene, or through other means. The "attention window" is a frame sequence whose length is specified in units of time or some other relevant metric, such as number of frames or interval between peaks in a particular function. One use of the attention window in the present invention is for computing relationships between "short-term" frames, e.g., frames that are close to each other based on measurements of acquisition time, similarity or other metrics. In some embodiments, a maximum frame rate and the corresponding frame size in memory are also derived from the system information. By way of non-limiting example, the attention window size for processing video images representative of cell spreading can range from ½ to many seconds, though other sizes may be used for capturing this and other processes. When an acquisition subsystem is replaced with a signal source, maximum frame rate is preferably the frame rate at which the data was acquired.

In some embodiments, the analysis module contains a first-in-first-out (FIFO) frame sequence buffer, though other buffering designs are possible. Preferably, this buffer is maintained in a high-speed storage area on the data processing device, such as a desktop computer's random access memory, though storage on a disk drive or other digital medium is also possible. In a preferred mode, the frame sequence buffer is sized according to the mathematical relation buffer size= (attention window size in seconds*initial frame rate in seconds*memory space needed for each frames)+an overhead factor. The overhead factor is selected empirically and, for example, can be in the range 1 to 5 percent, depending on memory management design. By way of non-limiting example, a frame sequence buffer for processing video images representative of a biological process may range from 30 to 120 MBytes, though other sizes may be used for these and other processes. Frames in the FIFO may also represent a fixed or variable or adaptively variable sampling of the incoming acquired frames. Incoming frames originate at the sensor (102). Frames exiting the data processing device (103) for storage or display (105 and 104) have associated labels and characterization data attached to them.

In some embodiments, frames are also optionally prefiltered to suppress or promote application-specific spatiotemporal characteristics. Incoming frames, by way of example, could be processed by standard methods in the art to extract gradient direction estimation at a particular spatial scale to amplify signals representative of changes in direction of an object or organism moving in the scene.

In some embodiments, certain analyses are performed on the luminance channel of each frame. In other embodiments, multiple color channels within each frame can be matched separately to corresponding color channels in other frames, with the resulting values combined into a single set of measurements or presented as distinct, one set per color channel. Still other embodiments incorporating visual sensors may use other channels in addition or instead of these, and embodiments incorporating non-visual sensors would use channels appropriate to the information produced by the sensor.

In some embodiments, certain analyses are performed on the dominant frequency band in each frame. This is a preferred mode when the assumption can hold that frequency content changes minimally between successive frames. The choice of frequency band(s) analyzed in other embodiments may be influenced by other factors.

In some embodiments, certain analyses are performed via correlations between sets of individual frames. In other embodiments, a frame might be correlated with a temporal accumulation or per-pixel rank function of some number of related frames. Many variations on this choice for the present embodiment and others noted above, including choices regarding how to process chromatic channels, regions of frames used, and potential preprocessing steps can be implemented to produce similar results.

Frames are transferred into the frame sequence buffer from the sensor (102) in a conventional manner. As widely known in the art, references to said frames can be used to remove the need to utilize system resources for an image copy.

Next, spatiotemporal signals in the acquired frames are analyzed. It is well-known in the art, by way of Parseval's Theorem that the integral of a spatiotemporal signal over time is proportional to the integral of its spatiotemporal frequencies.

$$\int_x \int_y \int_t I(x, y, t) \approx \int_{w_x} \int_{w_y} \int_{w_t} F(w_x, w_y, w_t)$$

Where I is intensity, F is frequency, x and y are spatial coordinates, t is time, $w_x$ and $w_y$ are the frequency components in the spatial dimensions and $w_t$ is the frequency component in the temporal dimension.

Put another way, the integral of the spatiotemporal signal between time t (0→t) and t+n (0→(t+n)) is an estimate of the change in spatiotemporal frequencies from time t to (t+n). When frames are acquired at a frame rate above the rate of change of the fastest changing element in the scene, the acquired frames are nearly identical, the integral of the underlying signal approaches a constant value from frame to frame, the difference in information between frames becomes negligible, yet spatial definition within the frame remains high and information content is high. In contrast, when elements change faster than the frame rate of the sensor, the frames are blurred: the integral of the underlying signal also approaches a constant value from frame to frame, but frames lose their spatial definition and consequently information content is reduced. Thus, an estimate of information rate is directly proportional to the rate of change in the temporal autocorrelation function, and consequently in the integral of the spatiotemporal frequencies.

Methods known in the art can be used to estimate changes in the rate of information content, though such estimates have limitations. Art-known compression standards such as MPEG are largely based on an assumption of fixed capture rate and output rate. MPEG encoders use block-based motion calculations to discover temporally redundant data between successive frames. This leads to the implementation of three classes of frames: spatially encoded frames (I), predicted frames (P) and bidirectional frames (B). Encoding frames in this way with a block-based technique, and relying especially on predicted frames to enable efficient compression, leads to data loss that could significantly impair the information content of frames that are found subsequently to be of particular interest. Furthermore, the MPEG method estimates the rate of change in information content using coarse and non-overlapping spatial blocks across a very narrow window (2-3 frames). This leads to further information loss. The net result is that MPEG compression enables temporal integrity in compression and playback, but at the loss of spatial integrity. The present invention enables the preservation of temporal integrity in frame sequences of interest, while also preserving spatial integrity.

Another compression standard, Motion JPEG, does not enable temporal compression and instead applies a variant of the standard single-image JPEG compression to every frame. In Motion JPEG compression, the rate of change in information content is estimated only spatially, and results in chromatic loss. Another approach, employing simple motion detectors, uses the average intensity difference between subsequent frames as an estimate of the rate of change in information content. This approach is limited in a number of ways, including that a change in lighting on a static scene would be perceived as "motion" even though nothing in the scene actually moved.

A human observer can easily and without any previous training measure attributes of a visual dynamic scene. This implies, for example and in a non-limiting way, that there may exist a significant amount of mutual information that is implied and reinforced by each and every frame in an attention window into a dynamic visual scene. In a dynamic system, events captured in closely-spaced frames and those captured in distant frames all impact the rate of change in information content. By performing the present methods in a preferred mode at or near the rate at which frame-to-frame information change is minimized, a characteristic function of the dynamic system can be estimated in small discrete steps where the values produced for a given frame depend on nearby frames as well as distant frames. By way of non-limiting example, such a system could be used to monitor a biological assay in which an event of interest is a particular motion pattern of a nematode worm. The pattern may last only fractions of a second, and may occur infrequently and unpredictably during the 18-day life of a wild-type worm. Nevertheless, moments in which this pattern was sensed would produce reinforcing information over the worm's life, and periods of absence of this pattern would produce reinforcing information of its absence. Therefore, the difference between the two, as represented in a self-similarity function such as those in the present embodiment, would enable the automated detection of each instance of the event of interest. An early realization of importance of both short-term and long-term correlations, as well as self-similarity as a model, was made by Mandelbrot during his work on 800 years of flood data on the Nile River during the construction of the Aswan Dam. Nevertheless, those skilled in the art have not yet found efficient methods to take advantage of long-term correlations in self-similarity analysis. The present invention provides such methods.

Figure 2A:
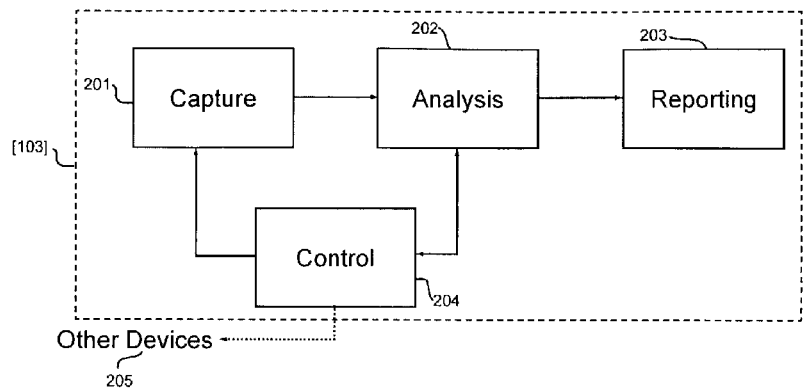
FIG. 2A is a high-level block diagram of an embodiment of the method.
Figure 2B:
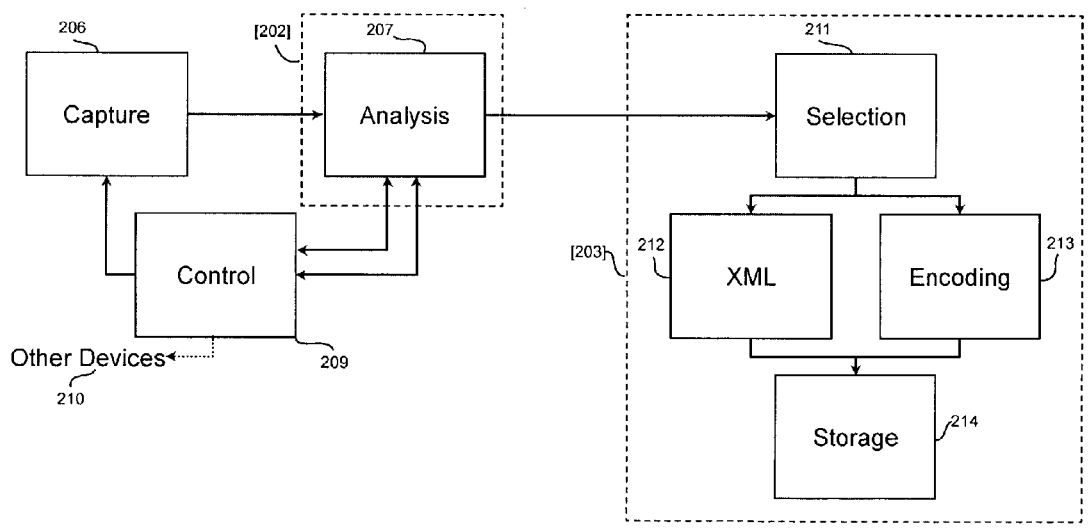
FIG. 2B is a detailed block diagram of an embodiment of the method.
Figure 3:
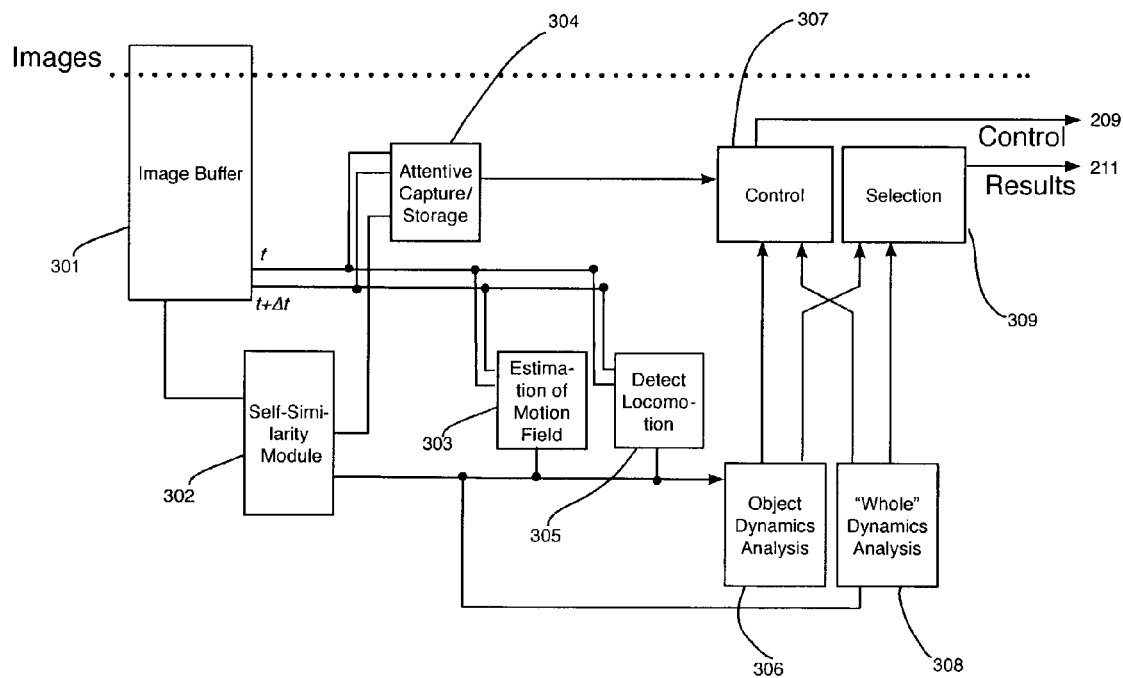
FIG. 3 is detailed block diagram of an embodiment of the analysis module.

Some embodiments of the invention use a Self-similarity matrix for modeling and analyzing spatiotemporal signals, as shown in FIG. 2. In the illustrated embodiment, the self-similarity matrix is a square matrix of normalized positive probabilities having a diagonal of ones, though in other embodiments the self-similarity matrix may have other characteristics instead or in addition. A self-similarity matrix has the form of a symmetric matrix, e.g., a real value Hermitian Matrix. In some embodiments, the invention employs a self-similarity matrix, frames and frame sequences to approximate a temporal autocorrelation of the acquired signal.

In some embodiments the invention exploits the near similarity of frames when sampled temporally at a rate near the dominant motion in the visual scene to approximate an autocorrelation. The nearly similar frames in aggregate approximate a correlation of a given frame with slightly shifted versions of itself. In other embodiments, correlations can be performed at a multitude of frequencies, or an autocorrelation function can be computed using methods well known in the arts.

Other embodiments of the invention might use other learning or approximation algorithms. Popular methods for analyzing spatiotemporal signal include PCA or ICA (Principal Component Analysis or Independent Component Analysis). In particular, PCA and ICA methods both employ a correlation matrix and are widely used in lossy compression methods.

In the illustrated embodiment, the self-similarity matrix is populated with all pairwise similarity measurements. Other embodiments might measure pairwise dissimilarity. Such measurement is straightforward to achieve within the present invention due to the fact that the sum of a similarity measurement and its corresponding dissimilarity measurement is always 1.0. Thus, (1—similarity measurement) yields the dissimilarity measurement. Known in the art is that Fourier optics can also be used to produce pairwise correlations between sequential frames as they are captured by a sensor. Frames generated in this way may be used for further analysis in accordance with the teachings herein.

In some embodiments, the pairwise similarity metric chosen is a normalized correlation (multiplicative) applied to the entire frame. The result of this kind of cross-match is a scalar value from −1.0 (perfect mismatch) to 1.0 (perfect match). In the illustrated embodiment, for reasons described below, we use the square of the cross match. In any case, the similarity metric is associative (Similarity (a,b)=Similarity (b,a)), Reflective (Similarity (a,a)=1.0), and Positive (Similarity (a)>0).

A well-known method for establishing image similarities is the "sum of absolute differences". This method has both advantages and disadvantages when compared to normalized correlation. Advantages to using the sum of absolute differences include:

(a) It is often faster on many computer platforms, and
(b) It is well-defined on flat intensity patches.

Disadvantages include:
(c) Cross-match result is not normalized,
(d) Cross-match result is not invariant to linear changes in intensity, and
(e) It is not equivalent to linear filtering.

In some embodiments, the present implementation of normalized correlation takes advantage of modem computing architectures to achieve near-parity in computational performance with a "sum of absolute differences" approach, and also detects when the input images have zero variance, thus enabling good definition on flat intensity patches.

In other embodiments, the cross-match operation can be accomplished by other multiplicative, subtractive, feature-based or statistical operations. In the illustrated embodiment, the similarity measurements have the additional property of behaving as spatiotemporal matched filters. Yet another embodiment might use other correlation-based motion detectors.

The self-similarity estimator module (302) estimates short term temporal similarity and approximates long term temporal similarity. In binocular applications, self-similarity is measured between each frame from each camera and every frame acquired by the other camera. In yet other applications, integration of spatiotemporal signals or the square of such signal may be used.

Short-term frames refer to frames in the above-mentioned buffer. Long-term frames refers to frame no longer in the buffer. The role of self-similarity is twofold: first, to boost nearby frames that are similar, and second, to reduce the contribution of dissimilar frames elsewhere. Those skilled in the art may recognize the usage of self-similarity in representing a nonlinear dynamic system or a dynamic system of unknown linearity. Self-similarity is estimated from the:

(1) $SS_{66}$=Self-Similarity Matrix (X, Δ) where X is the time series, and Δ is the time duration over which self-similarity is measured. In some embodiments, the self-similarity matrix is a square matrix.

To estimate short-term self-similarity, similarity of all frames in the buffer can be measured.

(2) $SS_{short-term, \Delta}$=Self-Similarity Matrix (X, Δ) where X is time sequence of frames, and Δ is the length of the buffer, and (3) SM(i,j)=correlation (min(i,j), max(i,j)), for all frames i, and j !=i (associativity)

(4) SM(i, i)=1.0 (reflectivity)

In some embodiments, as frames are acquired and placed in the image buffer (301), similarity matching is performed on at least the most recent frame and the frame immediately prior to it. Long-term pairwise matching between any two frames is approximated by treating the string of pairwise correlations separating the frames as transitional probabilities. Similarity metrics other than those described herein could be used, with an impact on the accuracy of this approximation. Correlation in the spatial domain is equivalent to a conjugate multiplication in the frequency domain. In some embodiments, (5) $SS_{long-term, \Delta}$=Self-SimilarityMatrix (X, $\Delta$) where X is a sequence of frames and $\Delta$ is the length of the FIFO, and (6) SM (i, j)=correlation(i,j), for all i, j and distance (i,j)=1 (associativity)

(7) SM(i, i)=1.0 (reflectivity)

(8) $SM(i,j)=(\Pi_{i->j} SM(i, i+1))^{1/(j-i)}$, (8A) where j>(i+1)

Equation (8) calculates the geometric mean of the pairwise correlation values separating i and j. Note that the approximations are associative, degrade with distance between i, and j, and produce 0 when any pairwise correlation along the way is 0. Further note that approximations are symmetric, SM(i, j)=SM(j,i).

Long-term and short-term similarities are combined to establish a self-similarity matrix for the entire duration of analysis. In some embodiments, lengthy durations may have windows of time where both short-term estimations and long-term approximations are used for similarity measurements. In some embodiments, shorter durations use short-term estimations entirely. Typically, this choice would largely be based on computational resources.

Further processing of the self-similarity matrix is independent of how the similarity measurements were produced; that is, the measurements can be produced via short-term estimation, long term approximation, or any weighted, normalized, or raw combination of the two.

Figure 5:
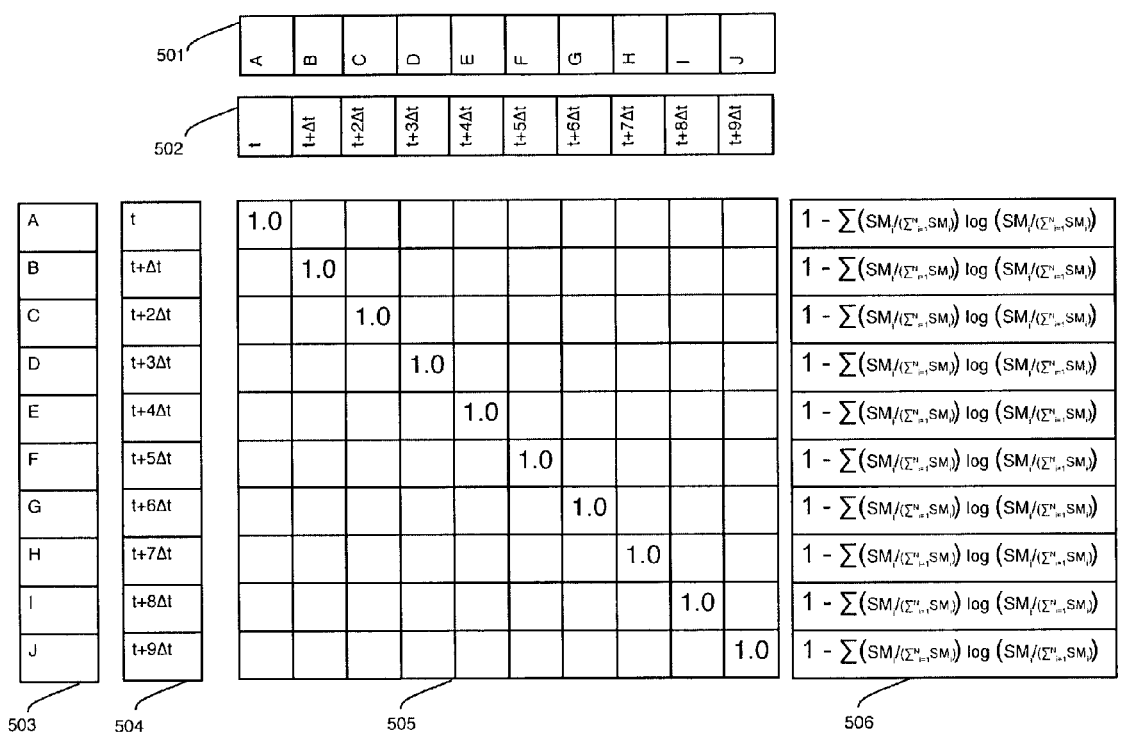
FIG. 5 is a diagram of a self-similarity matrix and entropic indices.

In some embodiments, the self-similarity matrix (505) is then used to estimate a measure of self-similarity for every frame with a frame sequence, as shown in FIG. 5. In some embodiments, an estimation of entropic indices for each frame is computed from the self-similarity matrix (506). In some embodiments, by way of non-limiting example, Shannon's Entropy Calculation is used. Shannon's entropy calculates the average uncertainty removed by a random variable attaining a set of measurements.

$$P_j = SM_j \Big/ \sum_j SM_{i,j} \quad \text{normalization} \quad (9)$$

(10) $H_j=-\Sigma P_j \log_2(P_j)/\log 2(n)$ where n is number of frames

For a given sequence, a random variable represents a set of entropic indices for each frame in the sequence. If all the frames in the sequence are exact copies, uncertainty is completely removed and Shannon's entropy is nearly zero. On the other hand, if every frame is completely dissimilar to all other frames, no uncertainty is removed and Shannon's entropy is nearly one.

The self-similarity matrix can be evaluated over the length of a frame sequence where said sequence can be fixed or can be a sliding window across a larger sequence. The calculation of self-similarity for said sliding window uses in preferred mode standard and well-known optimizations to reduce the computational cost to a linear function of the number of frames in the frame sequence.

Existing methods can meaningfully quantifying events of interest in images and image sequences, but only after a spatial or temporal segmentation step. In most cases, these steps are costly in terms of computational time and human intervention, and are impaired by the natural occurrence of noise in the signal. In some embodiments of the invention, dynamic systems presenting events of interest with characteristic visual signatures can be quantified without temporal or spatial segmentation. An example is a spatiotemporal signal representing a visual focusing process. Frames from said signal, as an example, may represent temporally out-of-focus frames, increasingly sharper frames, and in-focus frames. By way of example and for illustration, it is well known that out-of-focus images can be estimated as an in-focus image of the scene convolved with Gaussians. Gaussians with larger standard deviations, when convolved with an in-focus scene image, result in a more blurred image, and conversely, convolving the in-focus scene image with Gaussians having smaller standard deviations would result in a less blurred image. If we assume that pairwise similarity among said frames is proportional to $(\sigma_a-\sigma_b)^2$, where $\sigma$ is the standard deviation, the self-similarity matrix tabulates all pairwise similarity measurements. The frame corresponding to the Gaussian with the smallest standard deviation will have the largest accumulated dissimilarities as calculated by either shannon's entropy or a sum of squares method. Hence it will correspond to sharpest image.

The self-similarity matrix can be further manipulated in a number of ways. A standard method of analyzing a symmetric matrix is to compute its eigenvalues. A special property of a symmetric matrix is that the sum of its eigenvalues equals the sum of its diagonal elements. For instance, a symmetric N by N matrix representing pairwise similarities will have N diagonal elements each having a value of 1.0. The sum of the eigenvalues for such a matrix, within numerical precision, is N. Eigenvalues represent roots of an N-degree polynomial represented by the said matrix.

When computed from frames acquired appropriately, derived information from a self-similarity matrix may be used to distinguish visual dynamic processes within a class. As is well-known in the art, the Hurst Parameter can be estimated for a time series of self-similarity measurements. The Hurst Parameter can be used to characterize long-term dependencies. A self-similarity matrix and/or entropic indices can be analyzed to generate numeric evaluations of the represented signal. Many variations on the above choices on how to use self-similarity can be used within the spirits of the invention to produce similar results.

Standard statistical or matrix algebra methods can also be used. The following examples are illustrative only and do not limit the scope of the invention described in the claims.

(a) Largest Eigenvalue of Self-Similarity Matrix

A self-similarity matrix representing a sequence of images containing nearly identical scenes has an eigenvalue nearly equal to sum of its diagonal elements containing similarity match of an image to itself, 1.0 since a self-similarity matrix is a symmetric matrix. A sequence of images can be represented using said eigenvalue of said self-similarity matrix. A plurality of said eigenvalues representing "signatures" resulting from applying a set of perturbations to a system or set of similar systems can be used to rank said signatures with a consistent measurement of the dynamics of the systems under each perturbation.

(b) Periodicity of the Entropic Indices

Applying a self-similarity matrix to a frame sequence or image sequence containing at least 2 whole periods of images representing periodic motion such as that of a beating heart, and acquired with sufficient spatial resolution, produces entropic indices of the signal containing a dominant frequency at or near the periodicity of the imaged periodic motion.

Self-similarity as Motion Estimator

Figure 6:
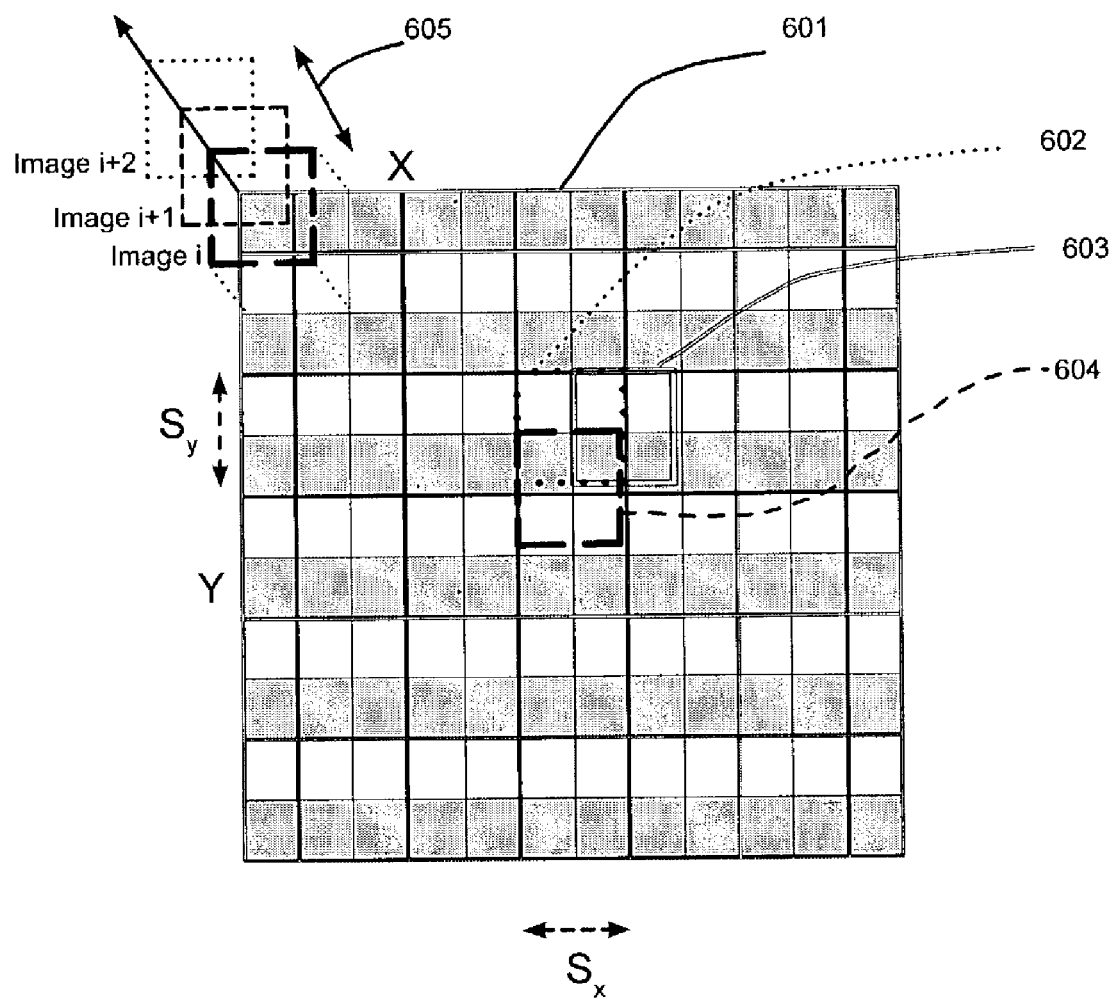
FIG. 6 is a diagram of the use of overlapping tiles for motion estimation.

In some embodiments, self-similarity is estimated with overlapping windows (602) and over a moving attention window (605). Specifically, frame geometry is sampled at $S_x$, and $S_y$. Defining the top-left as the origin of the sampling window of $2xS_x$, and $2xS_y$ in size, a self-similarity matrix is estimated for each sampling window, as shown in FIG. 6. Sampling windows share 50 percent of their enclosed pixels with their neighboring sampling windows (602) (603) (604). In the illustrated embodiment, the entropic indices are calculated and their standard deviation is used as an estimate of relative motion. Attention windows (605) are shifted forward one image and self-similarity is estimated for the newly shifted attention window.

Exemplary and Watershed Frames

Exemplary frames are frames that represent epochs of self-similarity in a frame sequence. Watershed frames are border frames that separate exemplary frames. One aspect of the illustrated embodiment is the availability of the self-similarity matrix for deeper analysis of temporal segmentation. A frame sequence that produces a flat integration path clearly describes an epoch best represented by a single exemplary frame. Techniques exist in the art for identifying such frames and related results from self-similarity matrices. In some embodiments of the invention, exemplary and watershed frames can also be identified while frames are being acquired, thus allowing a novel set of choices regarding further storage or processing of a given frame. In some embodiments, an accumulator image, accumulating the sum or the sum of the squares of the pixel values, with an appropriate depth, is created at the beginning of an analysis step. The following operations can be performed at the beginning of self-similarity estimation:

Note: if a new accumulator is needed, create one

(11) r=correlation (ACM, i), ACM is the accumulator image

(12) if (abs(r−SM(i, i−1)<user-threshold) label_frame (existing exemplary set)

(13) else label_frame (candidate watershed frame)

In some embodiments, a set of user preferences can be used to specify how many sequential watershed frames identify a watershed event. For instance, in certain dynamic processes, a user might be interested in frames corresponding to events taking place in a very small number of frames. Such preferences could be established in units of time, frames or any other relevant metric.

Focus Deviation Detection

Auto-focus and measurement of image sharpness have been a focus of research and multiple methods exist for measuring image sharpness. In some embodiments, the present invention detects deviation from focus in a continuous acquisition system. A self-similarity matrix of a frame sequence containing in-focus and potential out-of-focus frames is analyzed using (10) above. The choice of similarity measurement is crucial in unsupervised classification of in-focus and out-of focus frames. As known in the art, the normalized correlation relationship between two frames includes sharpness measurements of both images. In some embodiments, continuous focus deviation detection is implemented using a sliding measurement of self-similarity in a frame sequence.

Attentive Acquisition, Storage, and Control

The self-similarity matrix enables "selective" and/or "attentive" acquisition and/or storage of frames, i.e. "Attentive Capture." Attentive capture enables the system to operate, e.g., acquire, analyze, and/or store frames at a rate that closely approximates the rate of change in information content in the scene.

Attentive capture is an adaptive control system that dynamically adjusts acquisition parameters and/or issues control directives to external devices. Acquisition parameters that can be adjusted include, but are not limited to, rate, exposure, aperture, focus, binning. Additionally, attentive capture, in combination with parameters defined in a preferred mode by a user, defined empirically and/or established by default, generates storage directives. A typical parameter that could control both acquisition and storage is the level of spatial frequency that determines what constitutes an allowable level of change between frames. For example and without limiting the scope of the present invention, a biological assay may require the measurement of migration or other motility statistics on cells. To facilitate such measurements, acquisition parameters could be controlled such that frame-to-frame movement of cells is minimized, and storage could be controlled such that images would be stored singly or over a period of time only when a perturbation in migration or other motility statistics is detected.

Figure 4A:
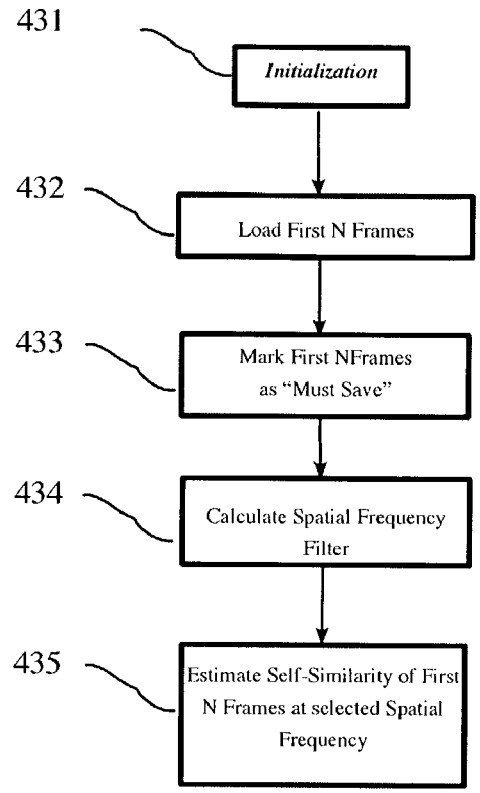
FIG. 4A is a block diagram of attentive capture initialization.
Figure 4B:
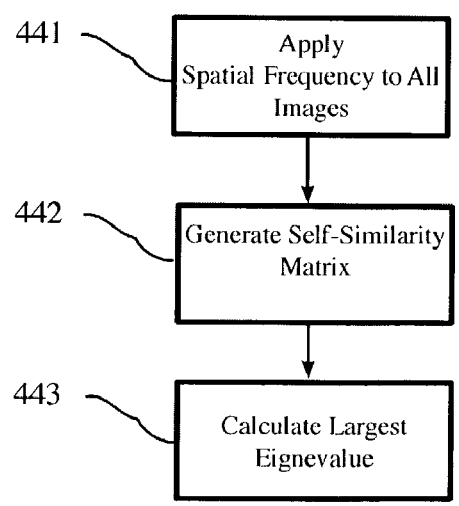
FIG. 4B is a block diagram of method of the self-similarity calculation.
Figure 8:
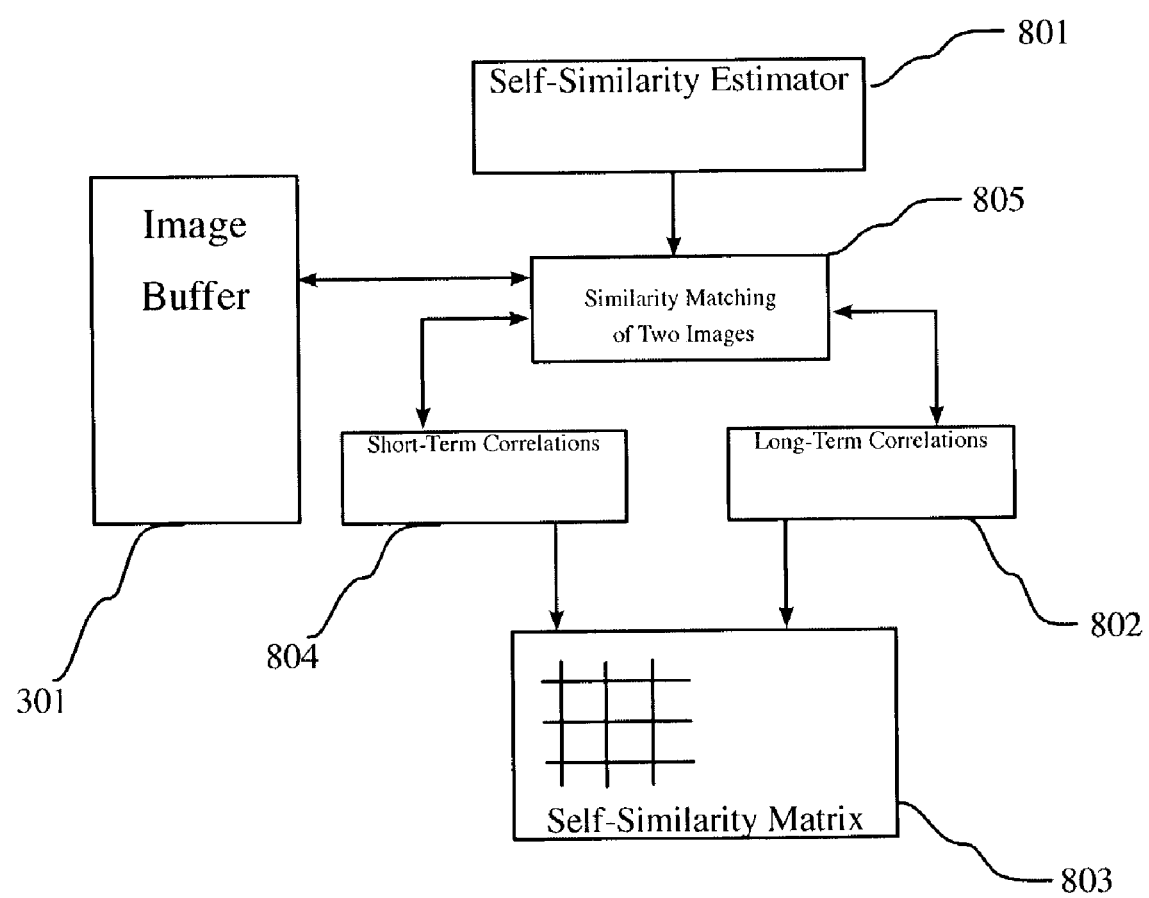
FIG. 8 is a block diagram of the method of estimating self-similarity.
Figure 9:
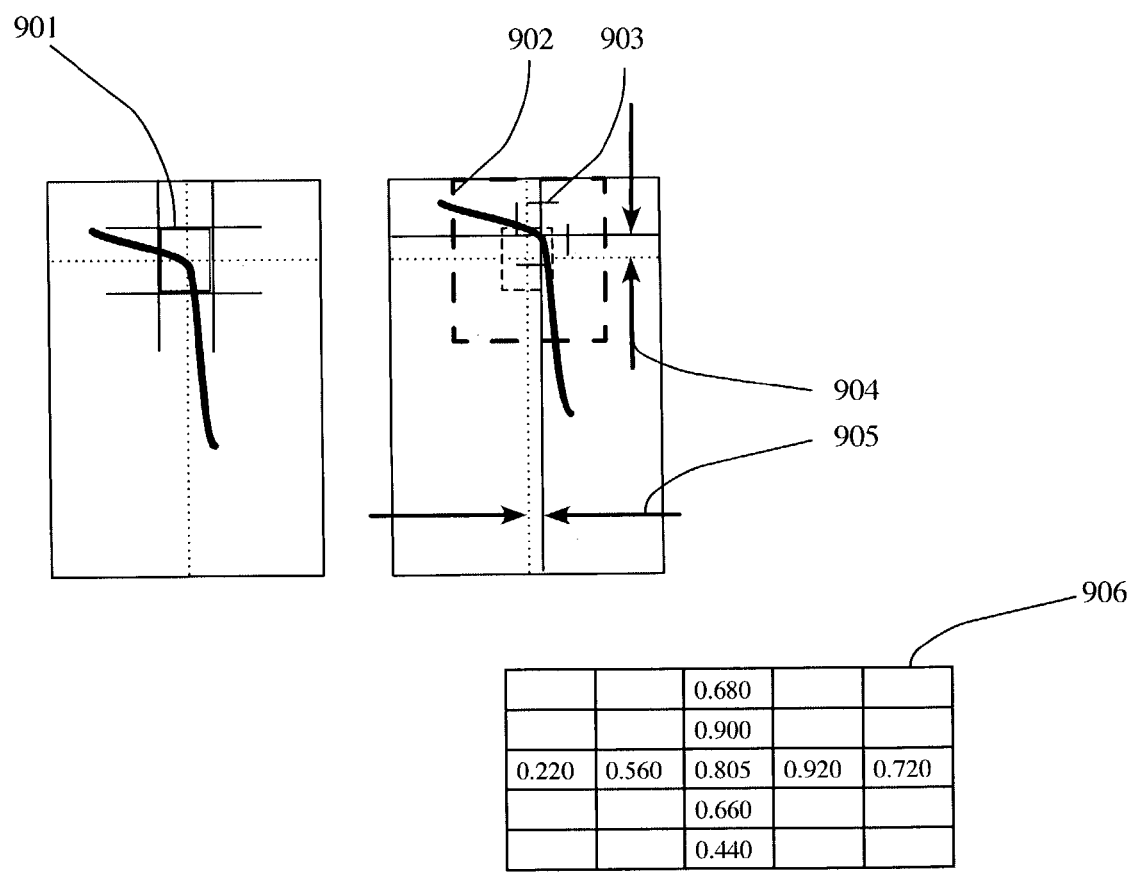
FIG. 9 is a schematic diagram of the method of estimating self-similarity.

In a preferred mode, a user of attentive capture supplies the system with a few parameters describing the amount of motion or change to attend to, an attention window size to assess self-similarity within, and an allowable deviation in self-similarity. In other modes, these settings could be default settings or determined empirically. During the initialization steps as shown in FIG. 4A, a number of frames, N, equal to the size of the attention window specified, are loaded in to the image buffer (301). In some embodiments, the number of frames is an odd number, though this could also be an even number. Said frames are marked as "must save" (433). One of skill in the art would recognize that any marking scheme may be used at this step. In some embodiments, the parameter indicating the amount of motion to attend to can be transformed into a Gaussian low-pass filter representing a Gaussian kernel of standard deviation larger than said parameter (434). The selected low-pass filter can be applied to all N images (441). Applying said filter attenuates spatial frequencies higher than those prescribed by the filter. A self-similarity matrix can be computed, as outlined in FIG. 8, and the eigenvalues of said matrix can be calculated. The largest eigenvalue is normalized according to the teachings herein, and this value represents an estimate of self-similarity for the frames in the attention window.

In some embodiments, after the initialization step and after the acquisition of every frame, an assessment can be performed as to the marking of said image.

Co-locomotion Module

Objects in images and frames can be defined and located using a wide range of their features. However, robust and accurate localization of objects is most likely when using features that are the most invariant to predictable and unpredictable changes in the object, its proximate surroundings, and the broader environment. If the objects are rigid bodies undergoing rigid transformation, one could assume conservation of brightness, and use brightness as a defining feature to locate objects. In many situations, however, this is not the case. In biological applications, for example, objects are deformable, undergo morphological transformations, and float in fluid or crawl along the surface of culture dishes among other changes. In some embodiments, the present invention provides algorithms that detect such motion patterns to define objects.

Corpetti et al., "Dense Estimation of Fluid Flows," IEEE Transactions on Pattern Analysis and Machine Intelligence, 24,3:368-380 (1998), incorporated herein by reference in its entirety, describe how the deformable nature of fluid motion, the complexity of imaging processes, and the possible variations of temperature and pressure in moving fluid all contribute to wide and unpredictable variations of the observed brightness for a given element of fluid. In turn, this degree of variation makes traditional feature detection for identifying objects extremely difficult to apply to fluid systems. In contrast, image sequences captured in accordance with the teachings herein reduce frame to frame transformation to translational change only (no rotation or shear), with linear changes in brightness regardless of the complexity of the underlying scene.

In some embodiments of the present invention, the co-locomotion module can be used to identify, assess, and track objects represented by a collection of adjacent pixels exhibiting motion in a similar direction. The co-locomotion module depends critically on an attentive acquisition sub-system to capture frames at a rate that nearly or actually minimizes the derivative of the change from frame to frame. An important property of frames acquired at this borderline of minimal change in information content is that frame-to-frame motion can be described locally using only its translation component.

In some embodiments, motion vectors can be estimated using a cross-correlation of each small region of an "origin" image with a corresponding larger region in the image acquired next after the origin image. The larger region in the next-acquired image and the smaller region in the origin image share a common center point. In some embodiments, by way of non-limiting example, larger or less square regions such as can approximate a bounding region around a representation of a nematode worm in an image sequence, might be selected for cross-correlation instead of the general-purpose square regions used in other embodiments. In still other embodiments, and also by way of non-limiting example, methods known in the art for definition of rigid objects could be applied to define bounding boxes around either rigid or semi-rigid objects, and these bounding boxes could form the basis of similar cross-correlations in accordance with the teachings herein.

The co-locomotion module can estimate motion fields e.g., larger patterns of motion in an image sequence derived through statistical analysis of collections of individual motion vectors. The co-locomotion module can also detect locomotive objects, track reference points within and morphology of boundaries of said objects, compute aggregate per-frame velocity statistics, maintain state information on changing objects over time, and maintain references to said object bounding image data across a frame sequence.

Motion Vectors

A motion vector is a vector in 3 dimensions x, y, and t (x-axis, y-axis, and time).

(14) $X=(x, y, t)^T$, represents a vector in the spatiotemporal domain.

Given two successive frames, $X_{i,j}$ is computed by matching "target," a small square image window in frame t, with "search," a larger square image window in frame t+1 that shares a common center point with target. This operation is performed at the desired sampling rate for every pixel in frame t and t+1 that obeys boundary conditions. In some embodiments, target is 5 by 5 pixels, search is 9 by 9, sampling rate is 1. The center of the first target is at coordinates (search width/2, search height/2) in frame t. The center of the first search window is at coordinates (search width/2, search height/2) in frame t+1.

Target is correlated with search in the spatial domain using a normalized correlation, with a slight improvement in a preferred mode. A standard normalized correlation of two images that contain constant and equal gray values is 0, implying no correlation. The preferred modified correlation is the square of the normalized correlation, which detects the zero case as a singularity in the underlying regression. Other metrics that measure the sum or the square of absolute differences between two images for use in the methods of the invention. Whereas a standard normalized correlation value is a normalized metric between −1.0 and 1.0, and whereas the square of a standard normalized correlation yields values in the range of 0.0 to 1.0, the sum of absolute differences returns average gray value difference, which is not normalized.

The correlation described herein can be performed in an exhaustive way. Target is matched with image data corresponding to a moving window of its size over search, resulting in a 5 by 5 correlation space. The normalized correlation, which is squared in the aforementioned preferred mode, is:

$$r = \text{Covariance}(I_1, I_2)/\sqrt{\text{Variance}(I_1) * \text{Variance}(I_2)} \qquad (15)$$

Figure 7:
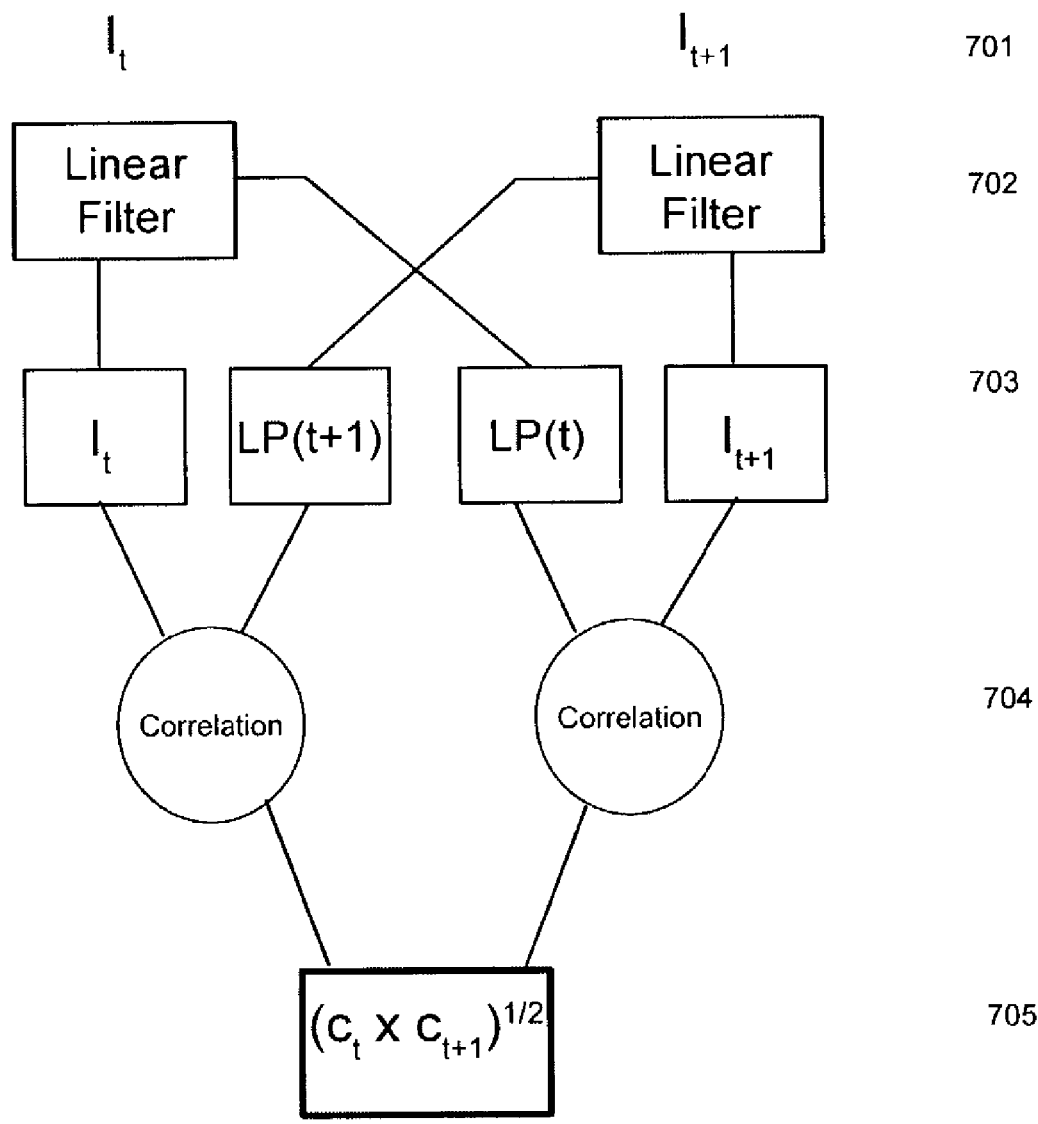
FIG. 7 is a block diagram of the method of global motion estimation.

In some embodiments, having maintained an acquisition rate at or above the rate of dominant motion or change in the scene, most if not all features of target have not moved outside of search. In areas of frame t and t+1 where the intensity function is nearly constant, the correlation space is flat and contains mostly singular correlation points. Furthermore, some correlation spaces contain poor correlation values. It is well known in the art that discarding the correct correlation spaces is accomplished by checking the highest correlation value with a figure of merit computed from local statistics. In the illustrated embodiment, we perform a spatial cross-correlation between frame t and t+1 to measure the degree of global motion between the two frames, as shown in FIG. 7. Two low-pass versions of frame t and t+1 are produced, G(t) and G(t+1). Then we perform the following correlations:

(16) $C_t$=correlation (frame t, G(t+1))

(17) $C_{t+1}$=correlation (frame t+1, G(t))

(18) GME (global motion estimation)=sqrt($C_t * C_{t+1}$)

The correlation peak value is compared to GME. The correlation space and its corresponding motion vector information is kept only if the correlation peak is above GME. Other embodiments may use residuals of a minimization process applied to the sum of the squared distances between motion vector positions in t+1 and positions in t that have undergone motion m. Yet other embodiments might use covariances of each motion vector displacement measurement. It is well known in the art that motion vector analysis can produce a motion vector for each point in an image. It is also known in the art that in practice, validation, correspondence and tracking of such motion vectors is ad-hoc. The teachings herein demonstrate a systematic and generally applicable means of validating, corresponding and tracking motion vectors.

If frame t and t+1 are exact copies of each other, then correlation peaks will all be at the center of the correlation space ((2.5, 2.5) using the above values for search and target). A motion vector is a vector with the center of the correlation space as its origin and the peak as its second point. The location of the peak is estimated using a weighted moments approach.

$$x_{peak} = \sum_{i,j} i*c(i,j) / \sum_i \sum_j c(i,j), \quad (19)$$

$$y_{peak} = \sum_{i,j} j*c(i,j) / \sum_i \sum_j c(i,j) \quad (20)$$

Where x and y are the relative axis at i,j (0 through 4 using the data above), and c is the correlation value at i,j.

With the above, then, $X_{i,j} = (x_{peak}, y_{peak}, t)$. Immediately we can produce displacement and direction by computing the Euclidean distance from the origin to the peak and the arctangent of peak position.

Detecting and Characterizing Objects Based on Motion Vector Co-locomotion

A locomotive object is an object defined by its motion. In some embodiments, locomotive patterns can be estimated using the totality of motion vectors for the first two frames. Detecting locomotive patterns involves assigning a label to each motion vector according to its proximity to other motion vectors. Proximity can be described by Euclidean distance. For each motion vector we accumulate the square of the pairwise distance between it and every other vector. Motion vectors with nearly identical total distance metrics receive similar labels. Objects defined based on this method can be further characterized based on the identification of the major and minor axis of the object.

A collection of motion vectors with similar labels can in turn be used to define a bounding box around an object represented in the image. With the bounding box defined, further applications of a self-similarity function are possible, e.g., to characterize the relationship of the contents of the bounding box in a given frame to the contents of corresponding bounding boxes in other frames. Other analyses of the bounding box and its contents are also possible, including, but not limited to, analysis of pixel intensity or other values produced by the sensor and contained therein, and/or statistical analyses of these and other measurements across a collection of bounding boxes of the same object or multiple objects across space and/or time. Still other analyses include applying image segmentation based on raw intensity, texture, and/or frequency.

Higher-level statistics regarding motion and motion patterns can be determined by applying standard statistical analyses to the totality of motion information for every locomotive object over a given frame sequence. Maheshwari and Lauffenburger, Deconstructing (and Reconstructing) Cell Migration, Microscopy Research and Technique 43:358-368 (1998), incorporated herein by reference in its entirety, suggests that individual cell path measurements can be used to predict cell population dispersion and also random motility. This outlines an algorithm for quantification of cell locomotion paths, using "center of mass" as the canonical registration point on a cell. In general, any repeatable and accurate registration point will suffice. Using the apparatus and methods described herein, this algorithm can be applied to the migration of each boundary point on a cell as well as a registration point described above as center of motion.

$$S = ((\sum s)/n) dt(dt \to 0) \quad \text{Translocation (21)}$$

$$P = 2 dt / (\sum \phi^2) / n \quad \text{Persistence Time (22)}$$

$$CI = (\sum (X \cdot G))/L \quad s \quad (23)$$

s is the Euclidean distance traveled in a time period,
n is the number of time points,
φ is the angle between successive displacements.
X is the displacement vector
G is the vector representation of the stimulus gradient In some embodiments, at the conclusion of analysis for a given frame, the most recently produced measurements can be applied to a set of application rules thus allowing the updating of the locomotive state for each object.

Characterizing Dynamic Biological System and Biological Units

In one aspect, the invention provides an apparatus, substantially as shown in FIG. 1, adapted for the characterization of biological units. Here, the sensor(s) (102), which can take the form(s) of a CCD, CMOS, line-scanning camera, infrared camera or other sensor of interest, captures one or more images of the scene (101), which in this case is a dynamic biological system. The dynamic biological system is contained in a suitable vessel, including but not limited to a slide, a flow chamber, a single-well Petri dish, a ninety-six well dish, or some other multi-well dish suitable for the biological unit(s) under study. A magnifying, amplifying or filtering device (109) can be used between the biological unit and the sensor. Possible magnifying devices include but are not limited to a standard light microscope, a confocal microscope, a stereo microscope, a macroscope and other wide field optics. Possible filtering devices include but are not limited to polarization, band-pass and neutral density filters. The computing device (103) and storage device (104) are configured and operated as described above, as further modified as described herein in order to characterize the dynamic biological system.

Characterizing Dynamic Biological Systems

In some embodiments of the invention, a dynamic system can be a dynamic biological system. A "dynamic biological system" as referred to herein comprises one or more biological units. A "biological unit" as described herein refers to an entity which is derived from, or can be found in, an organism. An "organism" as described herein refers to any living species and includes animals, plants, and bacteria or other microscopic organisms including protists and viruses. The biological unit can be living or dead, but is typically alive. Examples of biological units include cells, tissues, organs, unicellular organisms, and multicellular organisms. Also included are fragments of any of these, including cell fractions, e.g. membrane, nuclear or cytosolic fractions, and fragments or portions of organs, tissues, or organisms. Also included are subcellular objects, e.g., as described herein. Further examples include biological polymers (e.g. peptides, polypeptides, and/or nucleic acids), carbohydrates, lipids and ions. The biological unit can be either labeled or unlabeled. For example, a label might include an emitter, for example a fluorescent emitter, luminescent emitter or a radioemitter (e.g. alpha, beta or gamma emitter). A dynamic biological system can be an independently selected combination of the same or different biological units. Biological units can differ genetically, epigenetically, or phenotypically, as well as in developmental stage. Biological units can also be different by virtue of manipulation, e.g., treatments, e.g., exposure to one or more test compounds. By way of non-limiting example, a dynamic biological system can be a single well on a multi-well plate comprising two or more different cell types, two or more different organisms, or a combination thereof. The biological unit can be incorporated into biological, nonliving or nonbiological material, e.g., cell surface proteins can be incorporated into a liposome. For example, a dynamic biological system can comprise neurons and glia, C. elegans and bacteria, or macrophages and bacteria.

Any feature that can be detected by a sensor or combination of sensors is referred herein as an "attribute". For example, an attribute can be any feature of a biological unit that can be identified as an alteration in the intensity of one or more pixels in an image. One example of an attribute is the location of the plasma membrane which can be detected as the difference in the intensity of light transmitted through the dish the cell inhabits and the intensity of the light transmitted through the cell. The attributes of biological units can be monitored in response to the addition or removal of manipulations or treatments. Manipulations can include altering temperature, viscosity, shear stress, cell density, oxygen tension, carbon dioxide tension, composition of media or surfaces contacted, electrical charge, or addition of one or more other biological units of the same or different type. Such manipulations can be accomplished by methods commonly known in the art. Treatments can include modulation (e.g. increasing or decreasing absolutely, spatially, or temporally) of gene expression or protein expression, and/or the addition or removal of a test compound, e.g. small molecules, nucleic acids, proteins, antibodies, sugars, lipids or complex natural or synthetic compounds. A test compound can be a compound with known or unknown biological function. The attributes of biological units can be used to characterize the effects of the abovementioned manipulations or treatments as well as to identify genes or proteins responsible for, or contributing to, these effects. The attributes of biological units can also be used to characterize the interaction between said biological unit and a second biological unit or other entity, e.g., a surface prosthetic device, a surgical implant, or a therapeutic device.

In some embodiments, the movement of subcellular objects can be evaluated using the illustrated method and/or apparatus. Examples of subcellular objects that can be analyzed in this manner include, but are not limited to, proteins, nucleic acids, lipids, carbohydrates, ions, and/or multicomponent complexes containing any of the above. Further examples of suitable subcellular objects include organelles, e.g., mitochondria, Golgi apparatus, endoplasmic reticulum, chloroplast, endocytic vesicle, exocytic vesicle, vacuole, lysosome, nucleus. The movement of subcellular objects can be from one compartment of the cell to another, or can be contained within a single compartment. For example, a protein localized at the plasma membrane can traffic to the cytoplasm or nucleus, or can simple move from one region of the plasma membrane to another.

In some embodiments the method and/or apparatus described herein is used to monitor the state of the DNA in a dividing cell in order to characterize cell division. Cells described herein as appropriate for use in the analysis of cell division are also suitable for this embodiment, as are the experimental conditions described above. The DNA can be visualized by means of a fluorescent, vital dye, e.g., Hoechst 33342 or SYTO dyes (available from Molecular Probes), or through the use of polarization microscopy, as well as other means. In the case where the DNA is visualized via fluorescence, the illustrated apparatus must be modified to include appropriate excitation and emission filters. As the cells enter M phase, the DNA condenses and the otherwise diffuse pattern of nuclear fluorescence becomes localized first into punctate structures and then into discernable chromosomes. Chromosomes can be identified and tracked based on the colocomotion of motion vectors. The chromosomes then align at the center of the cell. Once at the center of the cell the chromosomes overlap visually and appear to be one large mass of DNA. Once the chromosomes begin to separate they can again be detected using motion vectors and tracked while they move towards the two poles of the cell and segregate into the two daughter cells. Based on the pattern of appearance, coalescence into one structure and separation into individual structures, the state of the DNA throughout mitosis can be assessed and used to evaluate the impact of manipulations and treatments on this complex process. This information can be used substantially as described above for mitosis.

Screening is the process of evaluating a plurality of manipulations, treatments or test compounds for their ability to modulate an attribute, or some other parameter of interest, e.g., affinity, between two similar or different biological units or between a biological unit and a treatment or test compound, interaction between two similar or different biological units or between a biological unit and a treatment or test compound in a computer based simulation or model (also known as rational drug design). The attributes of biological units can be used as a primary screen, e.g., to identify manipulations or treatments that are capable of modulating specific cellular attributes from a larger set of manipulations and treatments. Such a screen is said to be "high-throughput" if the number of manipulations and treatments is greater than 1,000. Attributes of biological units can also be used as a secondary screen, e.g., to further assess the activity of the aforementioned manipulations or treatments after their identification by another means, including, but not limited to, a previous screen. Furthermore, attributes of biological units can also be used assess the relationship between properties of treatments or a series of treatments, a process also known as determining structure-activity relationships. In this case, two or more treatments that share a similar property can be evaluated using the methods of the invention and can be the relationship between the similar property and an effect of treatment on an attribute evaluated. Treatments identified in any of the abovementioned manners can be further evaluated by deriving a series of next generation treatments, e.g. a new treatment that has been modified in one of more ways from the first treatment identified, which can then be evaluated using a similar or different method or apparatus.

A manipulation or treatment identified as a modulator of an attribute of a biological unit can function in the extracellular or intracellular space, e.g., plasma membrane, cytoplasm, mitochondria, Golgi apparatus, endoplasmic reticulum, chloroplast, lysosome, nucleus or other organelle. Based on these findings, manipulations or treatments can be developed as therapeutics with activity against diseases characterized by alterations in the attributes under study, or diagnostic tests for said diseases.

After the identification of manipulations or treatments with desired effects, the mechanism of action of these manipulations or treatments can be explored. One method for exploring the mechanism of action of a test compound or combination of test compounds is to identify polypeptides, nucleic acids, carbohyrates, lipids or ions that it interact with it.

This interaction can be identified using affinity-based purification as known in the art. This interaction can also be assessed using the technique commonly known as a "drug western" in which a treatment is labeled with a fluorophore or radioemitter and is used to probe an expression library. Alternatively, this interaction can be assessed using phage or cell display methods, where the interaction of phages or other cells expressing a library of proteins or polypeptides is used to identify proteins that interact with the treatment under study.

In addition to screening for manipulations and treatments that effect attributes of dynamic biological systems and biological units, the method and apparatus described herein can also be used to evaluate the activity of a gene. Gene activity can be modulated either at the level of the DNA (e.g., by targeted mutagenesis, or random mutagenesis), mRNA (e.g., by using RNAi, antisense RNA, or a ribozyme) or protein (e.g., by using a test compound, antibody, or other protein that interacts with the protein product of the gene under study). Gene activity can also be modulated by manipulating the biological unit. Furthermore, the activity of multiple genes can be modulated at the same time. Attributes of control cells and of cells where gene activity has been modulated can be compared and the activity of the gene under study is thus evaluated.

Examples of cellular attributes that can be evaluated using these analytical methods include, but are not limited to, cell morphology and morphological change (e.g., contraction, spreading, differentiation, phagocytosis, pinocytosis, exocytosis, polarization), cell division (e.g., mitisos, meiosis), cell motility, cell death (e.g., apoptosis or necrosis), and cell adherence. Examples of subcellular attributes that can be evaluated using these analytical methods include, but are not limited to, the expression, localization, or translocation of proteins, nucleic acids, lipids, carbohydrates, ions, multicomponent complexes containing any of the above. Further examples of subcellular attributes include the localization and number of organells, e.g., mitochondria, Golgi apparatus, endoplasmic reticulum, chloroplast, endocytic vesicle, exocytic vessicle, vacuole, lysosome, nucleus. Examples of organismal attributes that can be evaluated using these analytical methods include, but are not limited to, organismal motility, organismal morphology and morphologic change, organismal reproduction, organismal development, and the movement or shape change of individual tissues or organs within an organism. Attributes can be monitored through inspection with any one or combination of the sensors described above and are not limited to attributes visible via detection of either visible or fluorescent light.

A range of attributes that can be analyzed using the methods and apparatus described herein are detailed in FIG. 10. Specific embodiments of the analysis of the attributes of biological units are discussed below.

In some embodiments, the method and/or apparatus described herein can be used to characterize cell morphology. Morphology is important as a marker of many general cellular properties including, but not limited to, viability, mitosis, migration, adhesion, phagocytosis, differentiation and death. Morphologic change is also a feature of specific cellular events including, but not limited to, smooth and cardiac muscle contraction, platelet activation, neurite outgrowth, axon growth cone guidance, oncogenic transformation, white blood cell migration, white blood cell phagocytosis, and cancer cell migration. An automated means for analyzing morphology and morphologic change has broad applications in drug discovery and basic science research.

One example, not meant to be limiting, of morphologic change, is cell spreading, e.g., platelet spreading. Platelets are one of the cellular components involved in blood clot formation and morphologic changes are widely considered to be important markers of the platelet activation process. During the spreading process, platelets transition from a rounded morphology to a flat morphology. Platelets can be imaged during the spreading process using the illustrated embodiment with a suitable magnification device, for example a microscope. Mammalian platelets can be purified from whole blood using a number of well-established methods. Isolated platelets can then be placed in a suitable vessel and allowed to adhere to the surface. It is widely known that the surface properties of the vessel, i.e. the material itself as well as any coating or treatment, are important in determining whether or not the platelets will adhere and spread. It is also widely known that substances including ADP, fibrin and others, can be added to the platelet mixture to further activate the platelets and promote adherence and spreading. Thus, the invention includes methods of evaluating the effect on cell spreading, e.g., platelet spreading of manipulation of surface properties of a vessel containing the cells, and/or the addition of test compounds, including but not limited to ADP, fibrin, and the like.

Images of platelets are difficult to analyze because platelets are extremely small compared to other cells. Before spreading, round platelets generally measure between 1 and 5 microns in diameter. Once spread, platelets generally measure between 3 and 10 microns in diameter and between 1 and 3 microns in height. These dimensions result in transmitted light images that are low contrast using generally applied optical techniques such as phase contrast or differential interference contrast. As a result, it is difficult to perform detailed analysis of spreading based on morphological analysis using traditional intensity-based thresholding techniques without substantial human involvement.

In some embodiments, self-similarity can be used to analyze platelet spreading, thus eliminating the need to identify each platelet individually. Platelets can be purified from mammalian blood and washed using known centrifugation techniques. Purified, washed platelets are placed on a permissive substrate and/or activated with a suitable activator. Permissive substrates include, but are not limited to, plastic and glass, either untreated or treated with proteins, chemicals or nucleic acids. Other permissive substrates include biologic surfaces such as vascular endothelium (e.g. a plastic tissue culture dish surface coated with a monolayer of adherent human umbilical vein endothelial cells), or disrupted or modified vascular endothelium in intact or isolated blood vessels. Activators include, but are not limited to, von Willebrand factor, collagen, fibrinogen, fibrin, as well as proteolytic fragments of any of the above, ADP, serotonin, thromboxane A2. Shear stress is also an activator of platelets. During this process the platelets can be imaged using a suitable magnifying device and sensor, and the images are made available to a computing device for analysis.

In some embodiments, the computational approach described above for the calculation of self-similarity, either for the entire scene or for each individual platelet, can be applied to a sequence of images that depict platelets either spreading or not spreading in response to one or more manipulations or treatments. Because their morphology is changed by the spreading process, platelets that are spreading will have a lower degree of self-similarity than platelets that are not spreading. This morphologic information can be used as a surrogate for spreading and provides information about the impact of each manipulation or treatment under study. Thus, without specifically determining where the platelets are in each frame, or what their morphology is on an individual basis, self-similarity can be used to analyze the spreading process.

In addition to platelet spreading, self-similarity can be used to analyze any cell or organism that is changing shape, including, but not limited to skeletal, cardiac and smooth muscle under conditions that stimulate contraction (i.e. electrical stimulation, adrenergic stimulation, as well as other suitable physical and chemical stimuli). In some embodiments, the analysis of cell shape change described above can be employed to screen for manipulations and treatments that could be used to treat diseases of platelet activation, including but not limited to, deep venous thrombosis, peripheral artery occlusion, myocardial infarction, embolic stroke and pulmonary embolism, as well as disease of altered muscle contraction, including, but not limited to, hypertension, heart failure and chronic skeletal muscle contractures.

In another embodiment, the methods and/or apparatus described herein can be used to analyze cell motility. Cell motility is central to a wide range of normal and pathologic processes including, but not limited to, embryonic development, inflammation, tumor invasion and wound healing. Cell motility is highly variable from cell to cell and between cell types. In order to identify and analyze moving cells, existing image processing tools require either substantial human intervention or cell lines that have been genetically engineered to be fluorescent, a property that aids in image segmentation. An automated apparatus for analyzing cell migration, such as that described herein, is required to screen large numbers of manipulations or treatments in order to identify modulators of cell migration that may have broad therapeutic applications in a number of diseases. Autoimmune and inflammatory diseases are examples of diseases associated with changes in cell motility. Specific examples of said disease include, but are not limited to, rheumatoid arthritis, systemic lupus erythematosis, myesthenia gravis, ankylosing spondylitis, psoriasis, psoriatic arthritis, asthma, diabetes, atherosclerosis and transplant rejection. In addition to inflammation and autoimmune disease, cell motility is important for cancer, both solid tumors and hematologic malignancies, including carcinomas, sarcomas, lymphomas, leukemias and teratomas. Cell motility is also important for neuron and axon growth cone migration, pollen tube growth, and pathogen motility.

In some embodiments the methods and/or apparatus as described herein can be used to characterize white blood cell motility. This can be motility of primary white blood cells and/or an immortalized white blood cell line. Primary white blood cells can include lymphocytes, monocytes/macrophages, neutrophils, eosiniphils, and basophils, and can be prepared from mammalian blood. Immortalized white blood cell lines can include Jurkat, A20, AD10, Peer, L1.2, HL-60, PLB-985, THP-1, U-937, MonoMac6, K-562, AML14.3D10 (all of which are available from ATCC), as well as other cell lines characterized to be either normal or pathologic cells of the lymphoid and myeloid lineages.

In one example the white blood cell line HL-60, is grown in a flask, dish, multi-well dish or other suitable culture dish. The white blood cell line is induced to differentiate by one of a number of well characterized means, including treatment with DMSO or retinoic acid. Once differentiated, the white blood cell line is stimulated with an agonist of cell motility. The agonist can be applied to the entire population uniformly, or can be released from a point source in order to create a gradient of agonist. Agonists of cell motility include cytokines, chemokines, other products of inflammation, components of complement, other small molecules, ions and lipids. In this embodiment the preferred agonist of cell motility is a chemokine. Examples of chemokines include, but are not limited to, IL-8, GCP-2, Gro alpha, Gro beta, Gro gamma, ENA-78, PBP, MIG, IP-10, I-TAC, SDF-1 (PBSF), BLC (BCA-1), MIP-1alpha, MIP-1beta, RANTES, HCC-1, -2, -3, and -4, MCP-1, -2, -3, and -4, eotaxin-1, eotaxin-2, TARC, MDC, MIP-3 alpha (LARC), MIP-3beta (ELC), 6Ckine (LC), I-309, TECK, lymphotactin, fractalkine (neurotactin), TCA-4, Exodus-2, Exodus-3 and CKbeta-11. Agonist stimulation promotes cell adherence to contacted surfaces as well as cell motility. After agonist stimulation, cells are allowed to adhere for 1 hour and non-adherent cells are washed off. Images of the white blood cells are acquired (201) using a sensor (102) with an appropriate magnifying device (109) and acquired images are analyzed (203) using a data processing device (103), as described below. After analysis, data and frames are stored using a suitable storage device (104) which enables reporting (203) of the data.

In this embodiment, analysis (203) is a multi-component process that can include one or more approaches. Self-similarity between the images in the sequence is calculated. Self-similarity can be used to ensure that a minimal number of frames are acquired without missing important events by dynamically modulating the frame rate of the camera based on this measurement, described above as attentive acquisition. Alternatively, self-similarity between the images can also be used as a means for obtaining a global representation of the cell migration process (i.e. as a motion estimator) in order to establish a signature of the cell migration under the specific experimental conditions employed. Alternatively, self-similarity can also be used to identify exemplary and watershed frames as landmarks in the video sequence that mark the location of events of interest (equations 11-13). Alternatively, self-similarity can be used to identify frames where the focus has deviated from the established focal plane. Based on this identification, frames, e.g., artifactual out of focus frames, can be marked, removed from further analysis, and/or discarded.

Using techniques described herein, motion vectors can be calculated and a motion field created. Each object in the image sequence, cell or otherwise, can be localized based on the co-locomotion of motion vectors. Motion vectors can be used to calculate the aggregate velocity of all the white blood cells, as well as the velocity of each cell. Cell localization based on motion vectors also allows the establishment of temporal reference points, including, but not limited to the center of motion. By tracking temporal reference points, velocity, direction and other spatial metrics can also be calculated for each cell in every frame. In the case where the agonist of cell motility is released from a point source, directional movement towards that source is typically expected. By way of non limiting example, the aggregate direction and speed of an object can be calculated based on the sum of the motion vectors associated with it object. In addition, the direction and speed of the center of projections can be used to evaluate object motility.

Once a cell has been identified and characterized using one or more of the abovementioned parameters, it can be assigned to categories such as: not-moving, moving without directionality, moving with directionality, dividing, etc. By way of non-limiting example, a not-moving cell can be defined as one for which the magnitude of its aggregate motion vector is zero for the relevant temporal window. A cell moving without directionality can be defined as one for which the summation of its motion vectors is zero, or close to zero, during the relevant temporal window. A cell moving with directionality can be defined as one for which the summation of its motion vectors is non-zero during the relevant temporal window. A dividing cell can be defined as one for which, during the relevant temporal window, one object of interest with one center of motion is transformed into two separate objects of interest with separate centers of motion. These categorizations can be used to further characterize cell motility or the impact of a manipulation or treatment on cell motility.

Self-similarity, as well as the parameters described above, or another suitable parameter or set or parameters, can also be used to regulate the storage of images of migrating cells in order to further reduce the number of frames stored for each experiment. For example, the proportion of frames stored for any experiment can be dynamically controlled based on the degree of similarity that a single image has to the larger sequence of images being acquired in that experiment. Alternatively, the proportion of frames stored could be controlled based on some combination of the speed, direction, persistence, or other suitable parameter being measured in every frame. By storing frames based on self-similarity or other parameters, the number of stored frames is decreased and the amount of memory required for each experiment is decreased. This process is carried out by the selection module (211) and results in the conversion of attached data into XML data (212) and the encoding (213) of frames for storage (214) based on a series of user preferences.

Other examples of cells whose movement can be analyzed in the manner described herein include epithelial cells, mesenchymal cells, cells from the nervous system, muscle cells, hematopoietic cells, germ cells (e.g. sperm), bacteria and other single-cell organisms. In each case, cells are grown in a suitable culture device under conditions specific to that cell type. Cell movement can then be analyzed as described herein, e.g., as described for white cells. In all cases, these forms of characterization can be used to establish the impact of a manipulation or treatment on cell migration, e.g., for the purpose of characterizing each substance or treatment and deciding which substance or treatment may have the potential to be therapeutically or diagnostically relevant.

In another embodiment, the methods and/or apparatus described herein can be used to analyze cell division (e.g. mitosis or meiosis). Cell division is a complex and essential process for all living cells and organisms. The cell division cycle is generally considered to consists of four phases, G1, S, G2, and M. During G1, S and G2 most cells retain the morphology characteristic of that cell type. During M most cells round-up to assume an approximately spherical morphology, then segregate the chromosomes to two poles established within the sphere, and then the sphere is cleaved at a plane between those two poles.

Dividing cells can be studied by the methods described herein, including dividing mammalian cells, as well as other animal cells, yeast, bacteria and unicellular organisms. In some embodiments an adherent cancer cell line is studied, e.g., a cancer cell line including but not limited to, the cell lines MCF-7, BCap37, MDA-MB-231, BT-549, Hs578T, HT-29, PC-3, DU-145, KB, HeLa, MES-SA, NIH-3T3, U-87, U251, A549-T12, A549-T24 (all available from ATCC). Non-adherent cell lines can also be studied using the methods and apparatus described herein, although the change in morphology from flat to round does not occur. Otherwise, non-adherent cells can be analyzed as described herein for adherent cells. In order to increase the number of dividing cells observed in any time period, cells can be synchronized using known methods such as thymidine blockade, and/or serum starvation. In addition, cells can also be induced to divide using growth factors, re-administration of serum after starvation, radiation, or other known techniques.

Self-similarity changes relatively more at the start and end of cell division because these are periods of accelerated change from one morphology to another. As described above, at the start of cell division the cell changes from flat to spherical morphology and at the end the two resulting spheres transition to flat morphologies again. These dramatic periods of decreased self-similarity can be used as markers to identify the presence of dividing cells and to measure the length of time they spend in cell division.

In a further embodiment dividing cells can be identified using the pattern of motion vectors for each cell. In this method, the pattern of motion vectors for each cell is used to identify the cleavage plane. In a stationary spherical cell the center of motion can be used to establish the center of the cell. During cell division the plasma membrane of the cell is drawn inwards along a plane that intersects, or nearly intersects the center of the cell that is generally perpendicular to the axis of view of the sensor. As a result, a collection of motion vectors will exhibit a high degree of symmetry, largely pointing centripetally along a single axis. As the cell continues through division these centripetally oriented motion vectors gradually reorganize their orientation to identify two centers of motion that correspond to the future center of each future daughter cell. Based on this signature, cells can be identified as dividing.

It is generally appreciated that uncontrolled or improperly controlled cell division contributes to the development of cancer, other disease that involve excessive cellular proliferation, as well as other diseases and malformations. As a result, cell division is the subject of a tremendous amount of research and pharmaceutical development. A system, such as the one described herein, can be used in a broad range of applications that include, but are not limited to, testing manipulations or treatments for their potential role in mammalian cells as anti-proliferative agents and anti-cancer agents, as well as in diagnostic evaluation of cancer cells.

In another embodiment, the methods and/or apparatus as described herein can be used to analyze programmed cell death, also known as apoptosis. Apoptosis is central to the regulation of cell number in organismal development and throughout the life of an organism, and is implicated in a wide range of diseases from cancer to autoimmunity. Apoptosis results in a characteristic series of morphological changes in cells that have been well characterized, including, but not limited to, the arrest of cell motility and the onset of membrane blebbing.

In some embodiments a cell line, e.g., a cancer cell line is studied and can include any of the adherent cell lines described herein for cell division, and can also include a number of cell lines that grow in suspension, including, but not limited to HL-60, MOLT-4, and THP-1 (all available from ATCC), as well as other cell lines derived from leukemias or lymphomas. The arrest of cell motility is determined based on the assignment of temporal reference points, as described herein. For example, a cell can be said to have arrested motility if the center of motion moves less than 10% of either dimension of the cell in a period of 10 minutes. Membrane blebbing associated with apoptosis, or other cellular processes, is detected based on the clustering motion vectors at the surface of an otherwise non-motile cell. Blebs result in rapidly changing microdomains at the surface of cells that have a characteristic size and time course. The presence of rapidly changing domains of motion vectors, e.g., domains that contain 3 or more motion vectors that last for 10 minutes or less, at the boundary of the cell without a corresponding change in the center of motion is indicative of apoptosis.

The method of evaluating apoptosis described herein can be used to automate screening for manipulations or treatments that either promote or prevent apoptosis. For example, such an embodiment can be used to identify manipulations or treatments that promote chemotherapy-induced apoptosis or radiation-induced apoptosis of cancer cells but not normal cells, or that selectively kill specific subsets of T- or B-cells. This embodiment can also be used to identify manipulations or treatments that prevent apoptosis in response to ischemia and reperfusion, e.g., in stroke and myocardial infarction. This method could further be used as a diagnostic test for the frequency of apoptosis or the frequency of apoptosis in response to a manipulation or treatment. This information can be used for the diagnosis of a disease or the choice of a therapeutic agent based on its ability to induce apoptosis.

In another embodiment, the method and/or apparatus described herein is used to analyze cell adherence. Cell adherence is a dynamic process that depends both on the substrate and the cell, and is highly regulated at both levels. Cell adherence is important in normal development and physiology as well as in pathologic conditions such as, but not limited to, tumor invasion and metastasis, inflammation, axon guidance, atherosclerosis and angiogenesis. Cell adherence can be measured in a number of ways, including, but not limited to, placing cells in a culture dish for a defined period of time and then washing away any non-adherent cells and placing cells on a slanted surface and observing the number of cells that are stationary or rolling.

In another embodiment, cells are passed over a surface by virtue of their suspension in liquid in an apparatus commonly referred to as a flow chamber. The cells can include, but are not limited to, white blood cells, platelets and cancer cells. In each case both primary and immortalized cell lines representing these three categories of cells are suitable for analysis using the illustrated embodiment. Some examples of appropriate immortalized cell lines include HL-60, THP-1, U937, and K562 (all available from ATCC). Generally, the cells under investigation can be any cell type capable of adhesion, and the surface can be any solid or semi-solid material that supports the adherence of the cell type chosen for analysis.

In one example, primary human monocytes can be purified from whole blood using Ficoll-Hypaque density-gradient centrifugation followed by magnetic bead purification and can be passed over the surface of a flow chamber consisting of human umbilical vein endothelial cells (HuVEC) growing on the bottom of the chamber. These endothelial cells can be engineered to express specific adhesive receptors, including but not limited to, E-selectin, P-selectin, ICAM-1, VCAM-1, to promote adhesion and rolling. As cells pass over the endothelial cell surface a proportion of the flowing cells adhere and roll on the surface of the endothelial cells. Analysis of cell rolling can be performed using a number of different features of the illustrated invention. Useful approaches described herein include tracking the cells individually, analyzing their movement, and characterizing the whole scene by virtue of self-similarity. In the first embodiment, cells can be localized using motion vectors, and tracked by virtue of the assignment of temporal reference points. In this case, the center of motion is particularly well suited to this analysis by virtue of the cell's predictably round shape. Based on these temporal reference points, velocity can be calculated for both the flowing cells and the rolling cells, and the proportion of rolling cells can be determined based on their slower rate of rolling. Additionally, their rate of rolling and duration of rolling can be calculated based on their transition from a fast-moving to a slow-moving state.

In a further embodiment, whole characterization of the scene using self-similarity is employed to detect periods of difference within the experiment. If no cells adhere, the frames relate to each other in a consistent manner that is determined by the frequency of flowing cells passing in front of the sensor. As long as this frequency is approximately constant, the self-similarity should remain approximately constant. Whenever a cell adheres to the surface and begins to roll it will produce a decrease in self-similarity which can be used as a surrogate for an analysis of the cell itself. In this way, self-similarity can also be used as a motion estimator and can thus be used as an efficient and robust measure of rolling without specific assignment of features to any given cell. This approach is particularly valuable when large numbers of cells are passed in front of the sensor in each experiment.

The methods described herein for analyzing cell adhesion can be applied to the discovery of manipulations or treatments that modify cell adhesion. Such manipulations or treatments would be useful in treating or preventing a wide range of conditions including, but not limited to, cancer (by preventing tumor metastasis), inflammation (by preventing leukocyte homing to sites of inflammation) and thrombosis (by altering platelet adhesion and rolling). The illustrated embodiment can also be used as a diagnostic test of conditions charaterized by decreased cell adhesion, including von Willebrand disease, Bemard-Soulier syndrome, Glanzmann thrombasthenia, Leukocyte Adhesion Deficiency I, and Leukocyte Adhesion Deficiency II.

In another embodiment, the method and/or apparatus as described herein can be used to analyze the movement of a unicellular or multicellular organism. This organism can be chosen from a list that includes, but is not limited to, *Listeria* species, *Shigella* species, *E. coli, Dictyostelium, C. elegans, D. melanogaster, D. rerio* as well as other organisms. In multicellular organisms, movement is a complex process that requires the integration of multiple cell types within the organism to produce a coordinated behavior. As such, movement can be used to study the functioning of each of the cellular components involved as well as their integration into a properly functioning system.

In embodiment, *C. elegans* (referred to below as "worm") motility can be analyzed. In this embodiment the worm can be a wild-type worm or a worm harboring a genetic mutation or other alteration in gene or protein expression. In order to analyze worm movement, motion characteristics can be calculated using either a simple aggregate center-of-motion scheme, or using the medial-axis method calculated based on opposing motion vectors. The medial-axis method identifies the body of a worm by the collection of medial points between all paired, opposing motion vectors.

The methods described herein can be used to screen for manipulations or treatments that affect each component of the worm that can be involved in movement, including but not limited to the neurotransmitter systems employed. For example, an automated analysis of worm movement is used to identify treatments that modulate locomotory behavior controlled by the serotonin neurotransmitter system in an effort to identify substances with a selected effect on this complex system that has been implicated in human mood and clinical depression.

In another embodiment, the methods and/or apparatus as described herein can be used to evaluate organismal development. Organismal development is that period in an organism's life when it has yet to attain its mature or adult form, e.g. while in the egg, uterus, or other reproductive organ, or while outside the reproductive organ but considered to still be in the process of attaining a mature or adult form. Examples of organisms whose development can be analyzed using the illustrated method and/or appatatus include *C. elegans, D. rerio, X. laevis, D. melanogaster*, chicken, domesticated cow, *M. musculus*, and *H. sapiens*. Organismal development generally occurs over a period of hours to days or months, and as such is not readily amenable to continuous human observation. As a result, an automated system for the analysis of embryonic development is valuable to a range of activities from in vitro fertilization to the study of embryology and the evaluation of manipulations and treatments for their effect on events during organismal development.

In one embodiment, a human embryo is observed after in vitro fertilization. After fertilization, the embryo is maintained under controlled media conditions widely known in the art and can be monitored using a microscope and a suitable sensor, e.g., a CCD camera, enclosed in climate controlled chamber (e.g., constant temperature, CO2, O2 and humidity). One embryo is placed in each well of the culture dish. The embryos are monitored constantly for 3 days after fertilization. Cell division events are detected as described for mitosis above, using either of the two methods, however using changes in self-similarity is preferred. Over the 3 days of monitoring, the timing of each cell division is precisely recorded. It is expected that the embryo will undergo three mitoses, thus reaching the eight-cell stage. Based on the timing and number of mitoses, as well as other features such as cell symmetry and cell morphology, embryos can be chosen for implantation, or for further incubation until day five when they will have reached the blastocyst stage.

In another embodiment, the methods and apparatus described herein can be used to assess the behavior of an organ within an organism. The appropriate coordination of heart rate, rhythm and contractility are critical to the survival of organisms with a cardiovascular system, and defects that alter these parameters result in arrhythmias and/or heart failure and reduced survival. Heart rate, rhythm and contractility can be studied by visualizing the heart directly or by monitoring its activity based on hemodynamic or electrical sensors. In many developing organisms, as well as some adult organisms, it is possible to analyze the movement or activity of individual organs due to the transparency of the embryo or organism. Additionally, the heart and other organs can be made visible through the use of x-rays or other non-invasive imaging modalities, such as CT or MRI, with or without the addition of contrast media, depending on the organ and imaging modality. Therefore, imaging is an effective means for studying heart rate and rhythm in any organism where the movement of the heart can be visualized and an appropriate system is available for automated analysis.

In one embodiment, heart rate, rhythm and contractility are analyzed in *D. rerio*, also referred to herein as "zebrafish," embryos or larvae using the illustrated invention. Poorly pigmented mutants (Albino, Brass, Transparent) are preferred due to their greater transparency. Zebrafish used in this embodiment can also carry induced or spontaneous mutations that are either known or unknown to the investigator. Embryos and larvae can be studied at, for example, three to six days post fertilization. Animals are placed in a suitable vessel and may be anesthetized with phosphate-buffered tricaine and/or immobilized in low melting point agarose. Animals are imaged over a multiplicity of cardiac cycles and subject to analysis. The heart is identified based on the periodicity, e.g., the magnitude of the periodicity of motion vectors associated with it. The rate and rhythm of the cardiac cycle is identified and analyzed using the periodicity of its self-similarity during successive heart beats. Its size can be calculated based on geometric measurements, e.g., major and minor axis, obtained at periods in the cardiac cycle known to correspond to diastole and systole. Based on these dimensions, contractility can be assessed.

The methods and apparatus described herein can be used to analyze zebrafish that are part of or have been generated by a systematic mutagenesis screen or a screen for manipulations or treatments that alter cardiovascular function. More generally, this embodiment can be used to analyze the rhythmic contraction of any organ or tissue that can be visualized or acquired using a suitable sensor and rendered into a spatiotemporal signal. Manipulations or treatments discovered based on their ability to modulate smooth, cardiac or skeletal muscle function are potential therapeutics for medical diseases or conditions which result in or from altered muscle contraction, including, but not limited to hypertension, heart failure, inflammatory bowel disease, irritable bowel syndrome, skeletal muscle contractures, uterine contractions during labor, and hyperactive bladder syndrome.

In another embodiment, the methods and/or apparatus described herein can be used to evaluate the interaction of a biological unit with a surface. Interaction of biological units with surfaces is a complex and essential process that is central to an understanding of many physiological processes, such as a cell's interaction other cells, tissues and organs (e.g. bone or transplanted tissues and organs), and artificial surfaces such as prosthetics and implants. For example, platelets adhere to glass, plastic, or other manufactured surfaces and this interaction can be used as a surrogate for their interaction with endothelium or clot. Other examples of interaction between and among biological units and surfaces include, but are not limited to, fibroblasts interacting with the extracellular matrix, and cancer cells adhering to endothelial cells in the process of metastasis, and lymphocyte synapsis with antigen presenting cells during immune reactions. Still other examples of interaction between biological units and manufactured surfaces include kidney cells adhering to an artificial scaffold and fibroblasts adhering to medical devices such as orthopedic implants, artificial heart valves, and cardiac defibrillators.

In some embodiments, the surface with which the biologic units are interacting is uniform. Examples of uniform surfaces include inorganic substances such as steel, titanium, aluminum, ceramic, glass, and quartz, as well as organic substances such as plastic and fiberglass. In other embodiments the surface is variable, either in terms of gross surface roughness, or in terms of engineered variability via mechanical etching, plasma etching, or lithography. In still other embodiments, the surface is comprised of pores, openings, concavities, convexities, smooth areas and rough areas. Examples of such surfaces include micro-machined crystalline silicon, as well as nanotubes and patterned polymers. In still other embodiments, the surface variability comprises changes in composition. An example of compositional change includes variability based on composite "sandwiches" made from carbon fiber and epoxy. In still another embodiment, the surface variability comprises change in charge. An example of a charged surface includes a two-dimensional array of impedance electrode elements, or a two-dimensional array of capacitance electrode elements. In still other embodiments, surface variability could comprise the presence or absence of a treatment (e.g., a test compound), either in uniform concentration or in a gradient. Examples of test compounds include agonists such as cytokines, chemokines, other products of inflammation, components of compliment, small molecule, ions and lipids.

The interaction between one or more biological units and one or more surfaces can be assessed using a magnifying device and a suitable sensor to acquire images of the interaction over time. Images can be characterized using approaches to "whole characterization" such as self similarity. Images can also be characterized by identifying the objects in the image by virtue of motion vector colocomotion, and subsequent characterization of each object's adherence, morphological change, motility, cell division, or cell death, as described above.

In a related embodiment, biological units are exposed to one or more treatments while they are interacting with one or more surfaces, and those biological units are subsequently evaluated for their propensity to interact with the structure. An example of such a process is a the exposure of platelets to a monoclonal antibody while they are interacting with a glass surface coated with collagen. The assessment of the effect of a treatment(s) on the interaction between the biological unit and the surface is performed using a magnifying device and a suitable sensor to acquire images of the interaction over time. Images can be characterized using approaches to "whole characterization" such as self similarity. Images can also be characterized by identifying the moving objects in the image by virtue of motion vector colocomotion, and subsequent characterization of each object's adherence, morphological change, motility, cell division, or cell death, as described above.

In another embodiment, the methods and/or apparatus as described herein can be used to evaluate the propensity of one or more biological units to infiltrate a structure such as a prosthetic device. Examples of such prosthetic devices include, but are not limited to, false teeth, artificial jaw implants, artificial limbs and eyes, porcine and human cardiac valves, mastectomy implants, cochlear implants, orthopedic hardware, e.g. artificial joints. Such structures can be fabricated from one or more substances that could include, but are not limited to, stainless steel, titanium, ceramic, and synthetic polymers. The infiltration of the prosthetic device by the biological unit is assessed using a magnifying device and a suitable sensor to acquire images of the interaction over time. Images can be characterized using approaches to "whole characterization" such as self similarity. Images can also be characterized by identifying the moving objects in the image by virtue of motion vector colocomotion, and subsequent characterization of each object's adherence, morphological change, motility, cell division, or cell death, as described above.

In a related embodiment, biological units are exposed to one or more treatments while they are interacting with a prosthetic device, and those biological units are subsequently evaluated for their propensity to interact with the structure. An example of such a process is a white blood cell infiltrating a porcine valve in response to a chemokine normally produced by inflammation at the site of implantation. The assessment of the effect of a treatment(s) on the infiltration of the prosthetic device by the biological unit is performed using a magnifying device and a suitable sensor to acquire images of the interaction over time. Images can be characterized using approaches to "whole characterization" such as self similarity. Images can also be characterized by identifying the moving objects in the image by virtue of motion vector colocomotion, and subsequent characterization of each object's adherence, morphological change, motility, cell division, or cell death, as described above.

Databases

Images and numerical data from experiments described in the abovementioned embodiments can be stored in a database or in multiple databases, both of which will collectively be referred to as a "database" hereafter. Numerical data can include, but is not limited to, eigenvalues, self-similarity, positional information, speed, direction, intensity, number, size. Images can include all the images from the analysis of a dynamic biological system or a subset of the images, either selected using some predetermined rule or based on attentive acquisition and storage. By way of non-limiting example, images and numerical data from screens, e.g., primary, secondary or structure-activity relationship screens, as well as experiments designed to assess gene function can be entered into one or more databases. A database can also contain meta-data generated during the experiments, e.g., information on the state of each cell. Furthermore, a database can also contain annotation, e.g., experimental conditions, manipulations or treatments under consideration, as well as information from the published literature on components of the experiment, either entered manually or using automated methods. Information contained in such a database can be used to catalog information, or to provide a further understanding of each manipulation or treatment based on its behavior in multiple different screens or experimental situations, e.g., to identify which manipulations and treatments cause cell division as well as cell motility, when that is considered to be more desirable or less desirable than just causing cell motility alone. Information contained in such a database can also be used to match images or numerical data from genetic or chemical modulation of known targets with results derived from screens of uncharacterized manipulations or treatments. In this way, such a database can be used to identify the unknown target(s) of manipulations or treatments based on an attribute(s) shared with images or numerical data from the modulation of known targets.

The database can be any kind of storage system capable of storing various data for each of the records as described herein. In preferred embodiments, the database is a computer medium having a plurality of digitally encoded data records. The data record can be structured as a table, e.g., a table that is part of a database such as a relational database (e.g., a SQL database of the Oracle or Sybase database environments).

As used herein, "machine-readable media" refers to any medium that can be read and accessed directly by a machine, e.g., a digital computer or analogue computer. Non-limiting examples of a computer include a desktop PC, laptop, mainframe, server (e.g., a web server, network server, or server farm), handheld digital assistant, pager, mobile telephone, and the like. The computer can be stand-alone or connected to a communications network, e.g., a local area network (such as a VPN or intranet), a wide area network (e.g., an Extranet or the Internet), or a telephone network (e.g., a wireless, DSL, or ISDN network). Machine-readable media include, but are not limited to: magnetic storage media, such as floppy discs, hard disc storage medium, and magnetic tape; optical storage media such as CD-ROM; electrical storage media such as RAM, ROM, EPROM, EEPROM, flash memory, and the like; and hybrids of these categories such as magnetic/optical storage media.

A variety of data storage structures are available to a skilled artisan for creating a machine-readable medium having recorded thereon the data described herein. The choice of the data storage structure will generally be based on the means chosen to access the stored information. In addition, a variety of data processor programs and formats can be used to store the information of the present invention on computer readable medium.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of evaluating a dynamic system, comprising:
   a. acquiring a plurality of images representative of the dynamic system in two or more dimensions using at least one sensor;

b. determining self-similarity among a representative set of images using an unsupervised algorithm defined as being absent a previously known model, wherein the unsupervised algorithm is implemented on at least one data processing device; and c. characterizing the set of images as a statistical function of self-similarity;

thereby evaluating the dynamic system.

2. The method of claim 1, wherein the dimensions include any of time, space, frequency spectrum, temperature, presence or absence of an attribute of the system.

3. The method of claim 1, wherein:
the determining step includes determining self-similarity between all of the plurality of images; and
the characterizing step includes characterizing the dynamic system as a statistical function of the self-similarities determined with respect to the plurality of images.

4. The method of claim 1, wherein the images are acquired by a method comprising:
a. acquiring images at a first acquisition parameterization;
b. determining similarity between a selected image and at least one of the other images;
c. characterizing the images as a statistical function of self-similarity; and
the acquisition parameterization is adjusted as a function of the self-similarity of the images.

5. A method of evaluating a dynamic system, comprising:
a. acquiring a plurality of images representative of the dynamic system in two or more dimensions using at least one sensor;
b. determining self-similarity among a representative set of images using an unsupervised algorithm defined as being absent a previously known model, wherein the unsupervised algorithm is implemented on at least one data processing device, wherein determining self-similarity includes estimating a short-term temporal similarity and a long-term temporal similarity; and
c. characterizing the set of images as a statistical function of self-similarity, thereby evaluating the dynamic system.

6. The method of claim 5, further comprising combining the long-term and short-term similarities to establish a self-similarity matrix representative of an entire duration of an analysis.

7. The method of claim 6, further comprising processing the self-similarity matrix to model spatiotemporal signals.

8. The method of claim 6, comprising evaluating the self-similarity matrix by analyzing the symmetry of the matrix.

9. The method of claim 6, further comprising analyzing the self-similarity matrix to represent a signal.

10. The method of claim 6, wherein characterizing the set of images includes applying a matrix operation to the self-similarity matrix to characterize the dynamic system.

11. The method of claim 5, further comprising loading images into a frame buffer and using the loaded images for estimating the short-term temporal similarity.

12. The method of claim 11, further comprising using the loaded images for estimating long-term temporal similarity.

13. The method of claim 5, further comprising comparing the characterized set of images with a reference value.

* * * * *